US011015656B2

(12) United States Patent
Ishii et al.

(10) Patent No.: US 11,015,656 B2
(45) Date of Patent: May 25, 2021

(54) TORQUE TRANSMISSION JOINT AND ELECTRIC POWER STEERING DEVICE

(71) Applicant: NSK LTD., Tokyo (JP)

(72) Inventors: Toru Ishii, Maebashi (JP); Toru Segawa, Maebashi (JP); Ryou Oosawa, Maebashi (JP); Nobuyuki Nishimura, Maebashi (JP)

(73) Assignee: NSK LTD., Tokyo (JP)

( * ) Notice: Subject to any disclaimer, the term of this patent is extended or adjusted under 35 U.S.C. 154(b) by 351 days.

(21) Appl. No.: 16/323,942

(22) PCT Filed: Aug. 7, 2017

(86) PCT No.: PCT/JP2017/028636
§ 371 (c)(1),
(2) Date: Feb. 7, 2019

(87) PCT Pub. No.: WO2018/030358
PCT Pub. Date: Feb. 15, 2018

(65) Prior Publication Data
US 2019/0211884 A1 Jul. 11, 2019

(30) Foreign Application Priority Data

Aug. 8, 2016 (JP) .............................. JP2016-155992
Jul. 3, 2017 (JP) .............................. JP2017-130028

(51) Int. Cl.
*F16D 3/74* (2006.01)
*B62D 5/04* (2006.01)
(Continued)

(52) U.S. Cl.
CPC ............. *F16D 3/74* (2013.01); *B62D 5/0403* (2013.01); *B62D 5/0409* (2013.01); *F16H 1/16* (2013.01); *F16H 55/24* (2013.01); *F16D 3/68* (2013.01)

(58) Field of Classification Search
CPC ........... F16D 3/74; F16D 3/68; B62D 5/0403; B62D 5/0409; F16H 1/16; F16H 55/24
See application file for complete search history.

(56) References Cited

U.S. PATENT DOCUMENTS 5,928,083 A * 7/1999 Monahan .................. F16D 3/74
464/57
6,648,763 B2 * 11/2003 Ash ........................... F16D 3/74
464/87
(Continued)

FOREIGN PATENT DOCUMENTS

| JP | 2004-306898 A | 11/2004 |
|----|---------------|---------|
| JP | 2004-324780 A | 11/2004 |

(Continued)

OTHER PUBLICATIONS

International Search Report (PCT/ISA/210) dated Oct. 31, 2017 issued by the International Searching Authority in International Application No. PCT/JP2017/028636.

(Continued)

*Primary Examiner* — Kevin Hurley
*Assistant Examiner* — Michael R Stabley
(74) *Attorney, Agent, or Firm* — Sughrue Mion, PLLC

(57) ABSTRACT

A driving-side concave-convex portion of a driving-side transmission member is engaged with an elastic member. The driving-side concave-convex portion is engaged with an intermediate concave-convex portion of an intermediate transmission member with a circumferential gap being interposed therebetween. A driven-side concave-convex portion of a driven-side transmission member is engaged with the elastic member. The driven-side concave-convex portion is engaged with the intermediate concave-convex portion with a circumferential gap being interposed therebetween. Both axial side surfaces and a periphery of the intermediate (Continued)

transmission member are covered by a side surface covering portion and a periphery covering portion of the elastic member.

10 Claims, 20 Drawing Sheets

(51) Int. Cl.
 *F16H 55/24* (2006.01)
 *F16H 1/16* (2006.01)
 *F16D 3/68* (2006.01)

(56) References Cited

U.S. PATENT DOCUMENTS

| | | | | |
|---|---|---|---|---|
| 7,883,423 | B2* | 2/2011 | Kubota | F16D 3/68 |
| | | | | 464/73 |
| 9,051,973 | B2* | 6/2015 | Nakagawa | B62D 5/0409 |
| 9,388,863 | B2* | 7/2016 | Nakagawa | F16D 3/68 |
| 10,288,126 | B2* | 5/2019 | Segawa | B62D 5/04 |
| 10,738,834 | B2* | 8/2020 | Oosawa | B62D 5/0409 |
| 2008/0128195 | A1* | 6/2008 | Kubota | F16D 3/68 |
| | | | | 180/444 |
| 2008/0280709 | A1* | 11/2008 | Gouadec | F16H 55/14 |
| | | | | 474/94 |
| 2012/0004043 | A1* | 1/2012 | Lehmann | F16D 3/68 |
| | | | | 464/93 |
| 2015/0041241 | A1* | 2/2015 | Yoshikawa | B62D 5/0409 |
| | | | | 180/444 |
| 2015/0275946 | A1* | 10/2015 | Ishizaki | F16D 3/68 |
| | | | | 403/359.1 |
| 2015/0298733 | A1* | 10/2015 | Moriyama | F16H 1/16 |
| | | | | 180/444 |
| 2015/0354636 | A1* | 12/2015 | Kan Eda | F16D 1/0864 |
| | | | | 464/93 |
| 2017/0175821 | A1 | 6/2017 | Segawa et al. | |

FOREIGN PATENT DOCUMENTS

| | | |
|---|---|---|
| JP | 2006-17295 A | 1/2006 |
| JP | 2010-124621 A | 6/2010 |
| JP | 2012-131249 A | 7/2012 |
| WO | 2016/047643 A1 | 3/2016 |

OTHER PUBLICATIONS

Written Opinion (PCT/ISA/237) dated Oct. 31, 2017 issued by the International Searching Authority in International Application No. PCT/JP2017/028636.

* cited by examiner

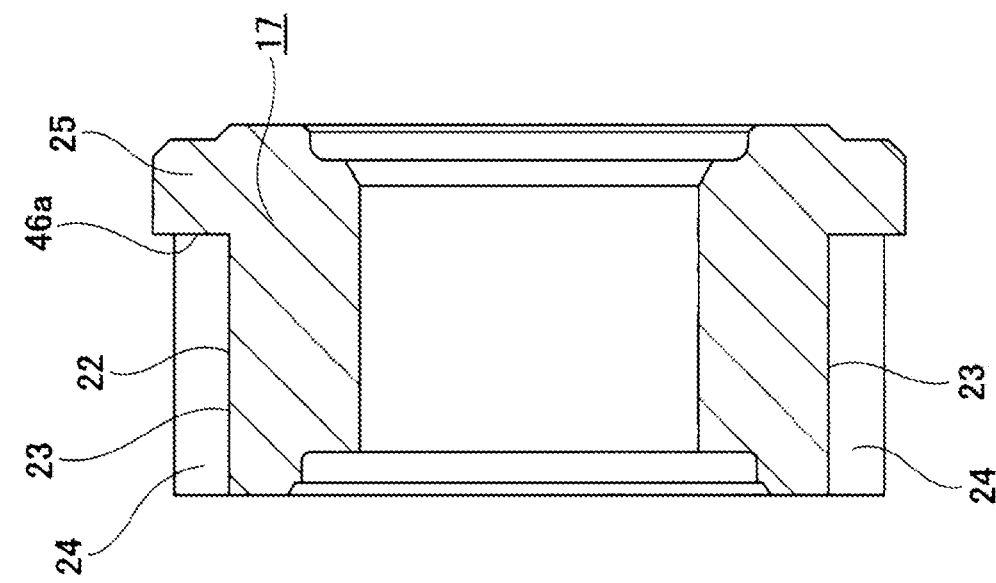
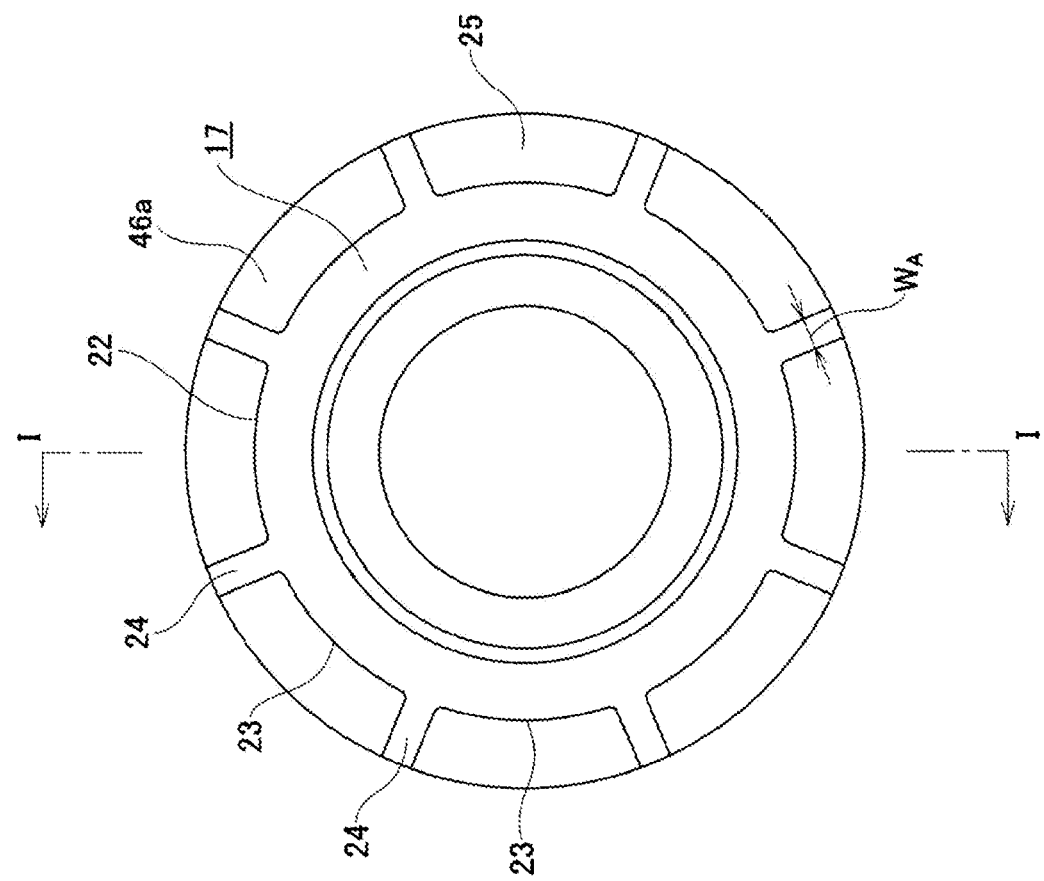

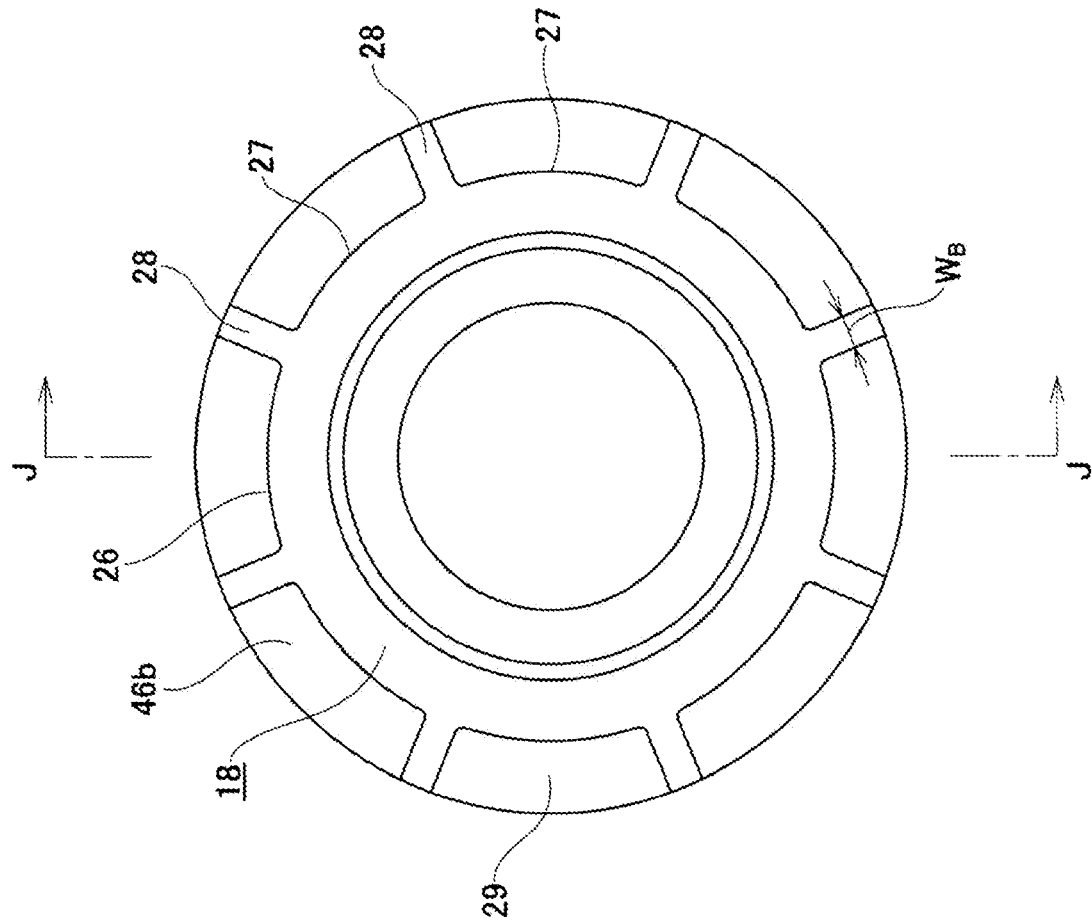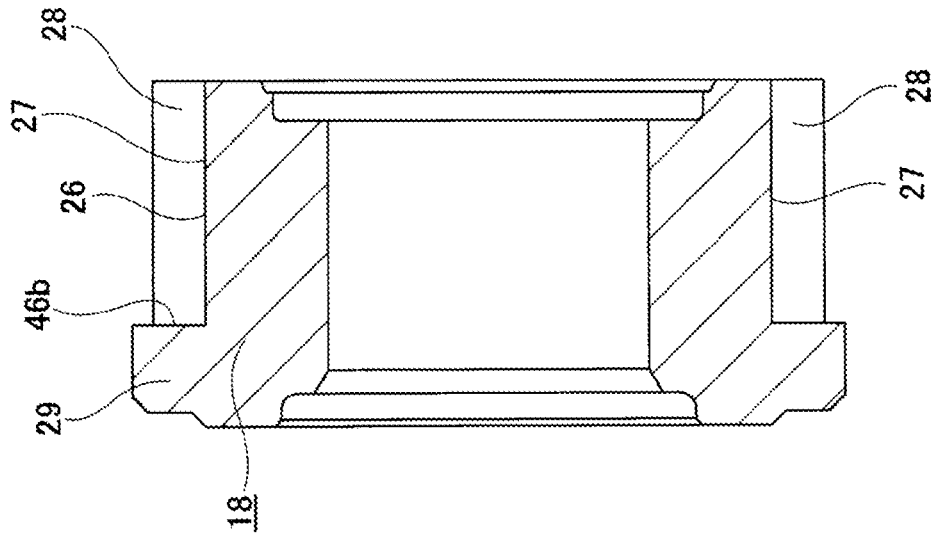

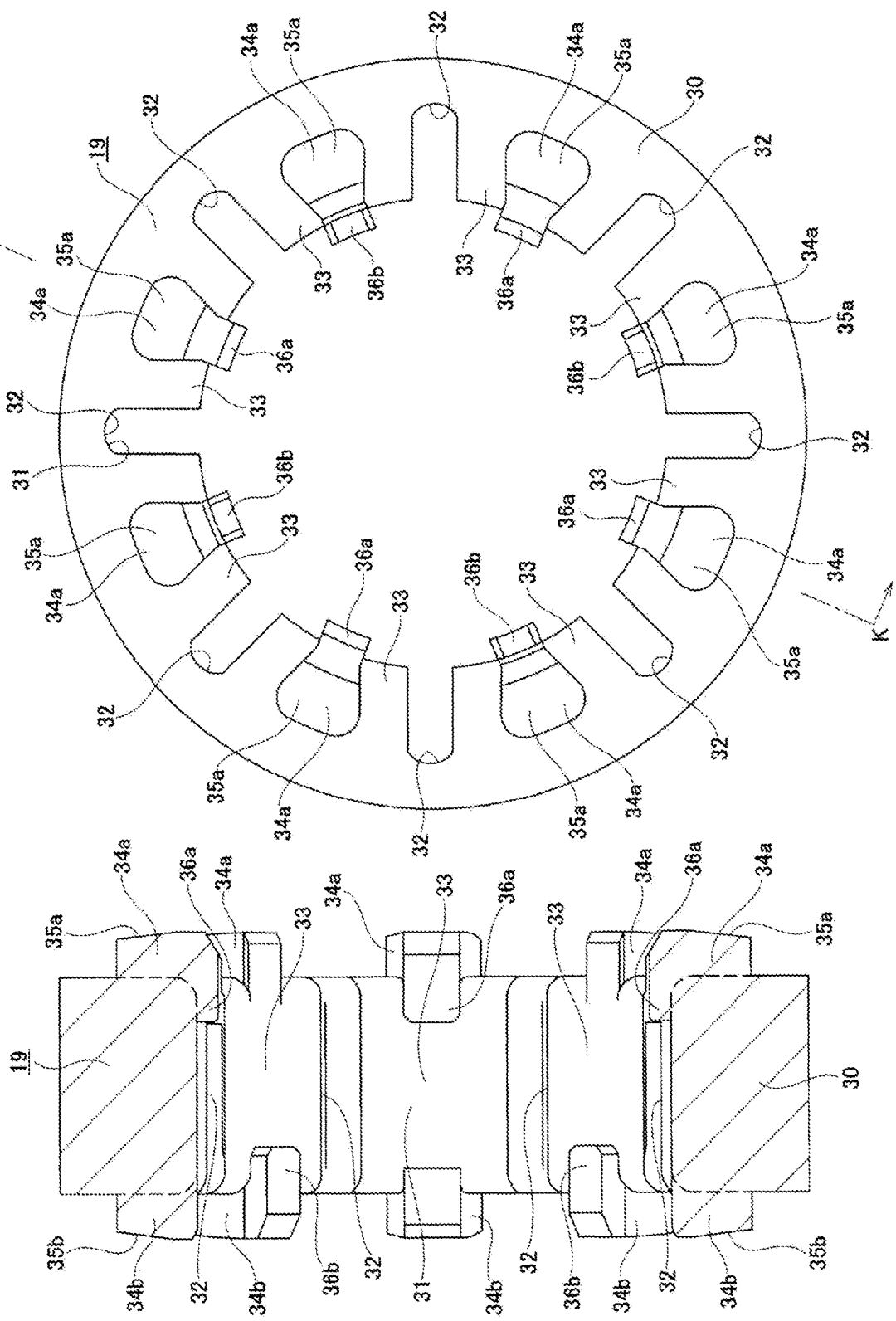

TORQUE TRANSMISSION JOINT AND ELECTRIC POWER STEERING DEVICE

TECHNICAL FIELD

The present invention relates to a torque transmission joint which is to be incorporated into various mechanical devices and used for transmission of torque between a driving shaft and a driven shaft. The present invention also relates to an electric power steering device which is to be used as a steering device of an automobile and is configured to use an electric motor as an auxiliary power source, thereby reducing a force necessary for a driver to operate a steering wheel.

BACKGROUND ART

FIGS. 18 and 19 show an example of a known electric power steering device described in Patent Document 1.

A front end portion of a steering shaft 2 to which a steering wheel 1 is attached at a rear end portion is rotatably supported in a housing 3, and a worm wheel 4 is fixed to a portion configured to rotate by the steering shaft 2. Worm teeth 5 configured to mesh with the worm wheel 4 are provided on an axially intermediate portion of a worm shaft 6, and both axial end portions of a worm 8 configured to rotate by an electric motor 7 are rotatably supported in the housing 3 by a pair of rolling bearings 9a, 9b such as a deep groove ball bearing. A pressing piece 10 is externally fitted to a part of a tip portion of the worm shaft 6, which protrudes more than the rolling bearing 9a. An elastic member such as a coil spring 11 is provided between the pressing piece 10 and the housing 3. The worm teeth 5 provided on the worm shaft 6 is pressed toward the worm wheel 4 by the coil spring 11 via the pressing piece 10. By this configuration, backlash between the worm teeth 5 and the worm wheel 4 is suppressed to reduce generation of gear striking noise.

According to the conventional structure as described above, it is possible to suppress the generation of the gear striking noise at the meshing portion of the worm teeth 5 and the worm wheel 4. However, it is not possible to suppress an abnormal noise, which is to be generated at a coupling portion between a tip portion of an output shaft 12 of the electric motor 7 and a base end portion of the worm shaft 6. This is described as follows.

According to the structure shown in FIG. 19, in order to couple the tip portion of the output shaft 12 of the electric motor 7 and the base end portion of the worm shaft 6 such that torque can be transmitted, the base end portion of the worm shaft 6 is formed with a spline hole 13 opening to a base end surface of the worm shaft 6. The tip portion of the output shaft 12 is formed with a spline shaft portion 14. The spline shaft portion 14 and the spline hole 13 are spline-engaged. Thereby, the output shaft 12 and the worm shaft 6 are coupled such that the torque can be transmitted.

If the spline shaft portion 14 and the spline hole 13 are spline-engaged without a circumferential gap (without the backlash), an abnormal noise is not generated at the coupling portion (the spline engagement portion) between the tip portion of the output shaft 12 and the base end portion of the worm shaft 6. However, in the actual situation, the backlash exists at the spline engagement portion. Particularly, when the backlash between the worm teeth 5 and the worm wheel 4 is suppressed by the structure as shown in FIG. 19, it is not possible to completely remove the backlash of the spline engagement portion because it is necessary to allow swingable displacement of the worm shaft 6. Therefore, there is room for improvement in suppressing generation of the abnormal noise in the spline engagement portion of the spline shaft portion 14 and the spline hole 13.

Patent Document 2 discloses a structure where the output shaft of the electric motor and the worm shaft are coupled via a metallic power transmission member having a cylinder shape such that the worm shaft can be smoothly swingably displaced. In the structure disclosed in Patent Document 2, since the worm shaft is swingably displaced, the backlash exists at spline engagement portions between spline shaft portions (male spline) provided at both end portions of the power transmission member and spline holes (female spline) provided at respective end portions of the worm shaft and the output shaft of the electric motor, respectively. Therefore, the abnormal noise may be generated when the rotational direction of the rotary shaft is reversed, and there is room for improvement in suppressing generation of the abnormal noise.

PRIOR ART DOCUMENT

Patent Document

Patent Document 1: JP-A-2004-306898
Patent Document 2: JP-A-2012-131249

SUMMARY OF THE INVENTION

Problems to be Solved

In view of the above circumstances, one aspect of the present invention provides a structure of a torque transmission joint capable of reducing generation of an abnormal noise when reversing a rotational direction of a driving shaft.

Means for Solving the Problems

A torque transmission joint according to an embodiment of the present invention is configured to transmit torque between end portions of a driving shaft and a driven shaft arranged in series in an axial direction, and includes a driving-side transmission member, a driven-side transmission member, an intermediate transmission member and an elastic member.

The driving-side transmission member is provided on an end portion of a driving shaft and includes a driving-side concave-convex portion which is formed by alternately arranging concave portions and convex portions in a circumferential direction on one radial side periphery thereof. For example, the driving-side transmission member is fixed to or integrally formed with the end portion of the driving shaft.

The driven-side transmission member is provided on an end portion of a driven shaft and includes a driven-side concave-convex portion which is formed by alternately arranging concave portions and convex portions in the circumferential direction on one radial side periphery thereof. For example, the driven-side transmission member is fixed to or integrally formed with the end portion of the driven shaft.

The intermediate transmission member includes an intermediate concave-convex portion which is formed by alternately arranging concave portions and convex portions in the circumferential direction on another radial side periphery thereof.

The elastic member is formed of an elastic material and assembled to the intermediate transmission member.

The elastic member includes a side surface covering portion configured to cover an axial side surface of the intermediate transmission member, and a periphery covering portion configured to cover the another radial side periphery (another radial side surface (another end surface) of the convex portions configuring the intermediate concave-convex portion) of the intermediate transmission member.

The driving-side concave-convex portion is engaged with the elastic member and is engaged with one axial end portion of the intermediate concave-convex portion with a circumferential gap being interposed therebetween (a circumferential side surface of the convex portion configuring the driving-side concave-convex portion faces a circumferential side surface of the convex portion configuring the intermediate concave-convex portion).

The driven-side concave-convex portion is engaged with the elastic member and is engaged with another axial end portion of the intermediate concave-convex portion with a circumferential gap being interposed therebetween (a circumferential side surface of the convex portion configuring the driven-side concave-convex portion faces the circumferential side surface of the convex portion configuring the intermediate concave-convex portion).

In the above configuration, the driving-side concave-convex portion may be engaged with the one axial end portion of the intermediate concave-convex portion in a state where the circumferential gap interposed therebetween is larger than a circumferential gap (including a case without a circumferential gap) interposed between the driving-side concave-convex portion and the elastic member at an engagement portion therebetween.

In the above configuration, the driven-side concave-convex portion may be engaged with the another axial end portion of the intermediate concave-convex portion in a state where the circumferential gap interposed therebetween is larger than a circumferential gap (including a case without a circumferential gap) interposed between the driven-side concave-convex portion and the elastic member at an engagement portion therebetween.

In the above configuration, a positioning side surface which is in contact with or closely facing an axial side surface of a coupling body of the intermediate transmission member and the elastic member may be provided on at least one of the driving-side transmission member and the driven-side transmission member.

In the above configuration, an inclined side surface portion which is inclined in a direction directed an axially inner side as proceeding toward a radially outer side may be provided on the axial side surface of the coupling body of the intermediate transmission member and the elastic member.

In the above configuration, in the elastic member, a guide concave portion which is recessed in the axial direction from a peripheral portion thereof may be provided on at least one of one axial end opening peripheral edge portion of a portion to be engaged with the convex portion configuring the driving-side concave-convex portion and another axial end opening peripheral edge portion of a portion to be engaged with the convex portion configuring the driven-side concave-convex portion.

In the above configuration, the elastic member may include a pair of divided members which are divided at a center portion in the axial direction.

In this case, the intermediate transmission member may include an axial male side engagement portion protruding from the axial side surface of the intermediate transmission member in the axial direction and a radial male side engagement portion protruding from the other radial side periphery of the intermediate transmission member in the radial direction which are continuous with each other, and each of the divided members may include an axial female side engagement portion to be engaged with the axial male side engagement portion and a radial female side engagement portion to be engaged with the radial male side engagement portion which are continuous with each other.

In the above configuration, a circumferential width dimension of the convex portion configuring at least one of the driving-side concave-convex portion and the driven-side concave-convex portion may decreases as proceeding toward a center side of the intermediate transmission member in the axial direction.

An electric power steering device according to an embodiment of the present invention includes a housing, a rotary shaft, a worm wheel, a worm and an electric motor.

The rotary shaft is rotatably supported to the housing.

The worm wheel is supported coaxially with the rotary shaft and configured to rotate together with the rotary shaft.

The worm includes a worm shaft with worm teeth provided at an axial intermediate portion thereof, and both axial end portions of the worm shaft are respectively rotatably supported to the housing by bearings with the worm teeth being meshed with the worm wheel.

The electric motor is configured to rotate the worm while being supported by the housing, for example.

An output shaft of the electric motor which is a driving shaft and the worm shaft which is a driven shaft are connected by a torque transmission joint such that torque can be transmitted.

The torque transmission joint is the torque transmission joint described above.

The above electric power steering device may further include a preload applying mechanism provided between a tip portion (an end portion which is opposite to a side coupled to the output shaft of the electric motor via the torque transmission joint) of the worm shaft and the housing and configured to elastically press the worm toward the worm wheel.

Effect of the Invention

According to the above-described torque transmission joint and electric power steering device, generation of an abnormal noise can be suppressed when reversing a rotational direction of a driving shaft.

That is, in the above configuration, the driving-side concave-convex portion is engaged with the one axial end portion of the intermediate concave-convex portion with a circumferential gap being interposed therebetween, and the driven-side concave-convex portion is engaged with the another axial end portion of the intermediate concave-convex portion with a circumferential gap being interposed therebetween. Therefore, when torque is transmitted from the driving shaft to the driven shaft, in an initial stage, in engagement portions between the elastic member and the driving-side concave-convex portion and the driven-side concave-convex portion, the circumferential side surfaces of the convex portions configuring the driving-side concave-convex portion and the driven-side concave-convex portion can come into contact with the circumferential side surface of the convex portions configuring the intermediate concave-convex portion after the elastic deformation of the elastic member. Accordingly, the contact forces are weakened by the elastic deformation of the elastic member, so that generation of the abnormal noise to be caused as the contact occurs is suppressed. As a result, even when the rotational direction of the driving shaft is reversed, the generation of an abnormal noise can be suppressed by the engagement portions between the intermediate concave-convex portion and the driving-side concave-convex portion as well as the driven-side concave-convex portion.

In the present invention, in a case where eccentricity, inclination or the like occurs between the driving-side transmission member (driving shaft) and the driven-side transmission member (driven shaft), the side surface covering portion and the periphery covering portion configuring the elastic member can function as a buffer member, so that the driving-side transmission member (driving shaft) and the driven-side transmission member (driven shaft) can be prevented from being strongly brought into contact with the axial side surface and the other radial side periphery of the intermediate transmission member. Therefore, generation of an abnormal noise based on such contact can be suppressed.

BRIEF DESCRIPTION OF DRAWINGS

FIG. 13A and FIG. 13B show the driving-side transmission member according to the first embodiment of the present invention, in which FIG. 13A is a view as seen from a left side of FIG. 13B, and FIG. 13B is a sectional view taken along an I-I line of FIG. 13A.

FIG. 14A and FIG. 14B show the driven-side transmission member according to the first embodiment of the present invention, in which FIG. 14A is a sectional view taken along a J-J line of FIG. 14B, and FIG. 14B is a view as seen from a right side of FIG. 14A.

FIG. 16A and FIG. 16B show an intermediate transmission member according to the first embodiment of the present invention, in which FIG. 16A is a sectional view taken along a K-K line of FIG. 16B, and FIG. 16B is a view as seen from a right side of FIG. 16A.

FIG. 17A and FIG. 17B show a driving-side elastic member (driven-side elastic member) according to the first embodiment of the present invention, in which FIG. 17A is a sectional view taken along an L-L line of FIG. 17B, and FIG. 17B is a view as seen from a right side of FIG. 17A.

DESCRIPTION OF EMBODIMENTS

First Embodiment

A first embodiment of the present invention will be described with reference to FIGS. 1 to 17.

Figure 18:
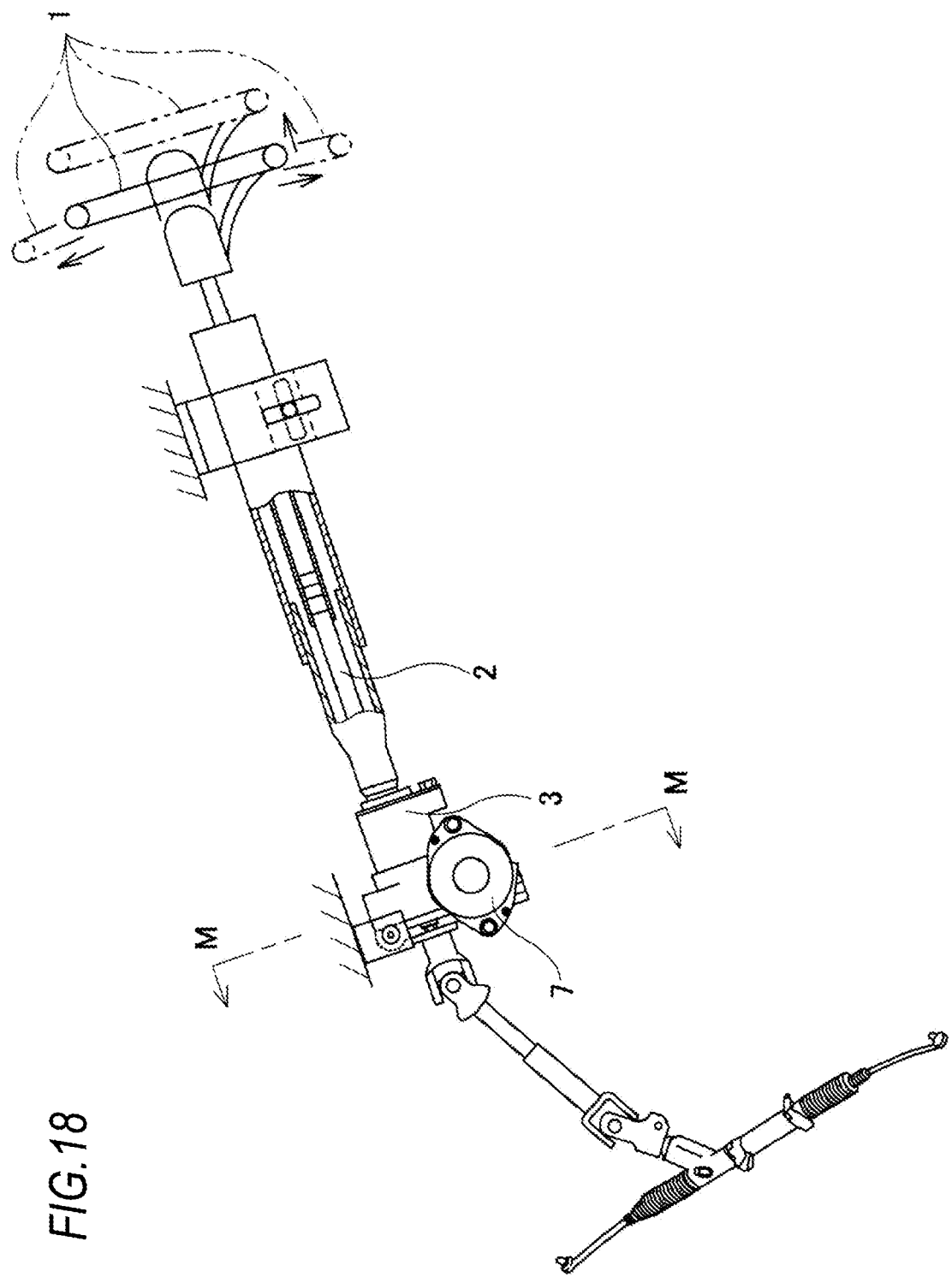
FIG. 18 is a partial sectional side view showing an example of a conventional structure of an electric power steering device.
Figure 19:
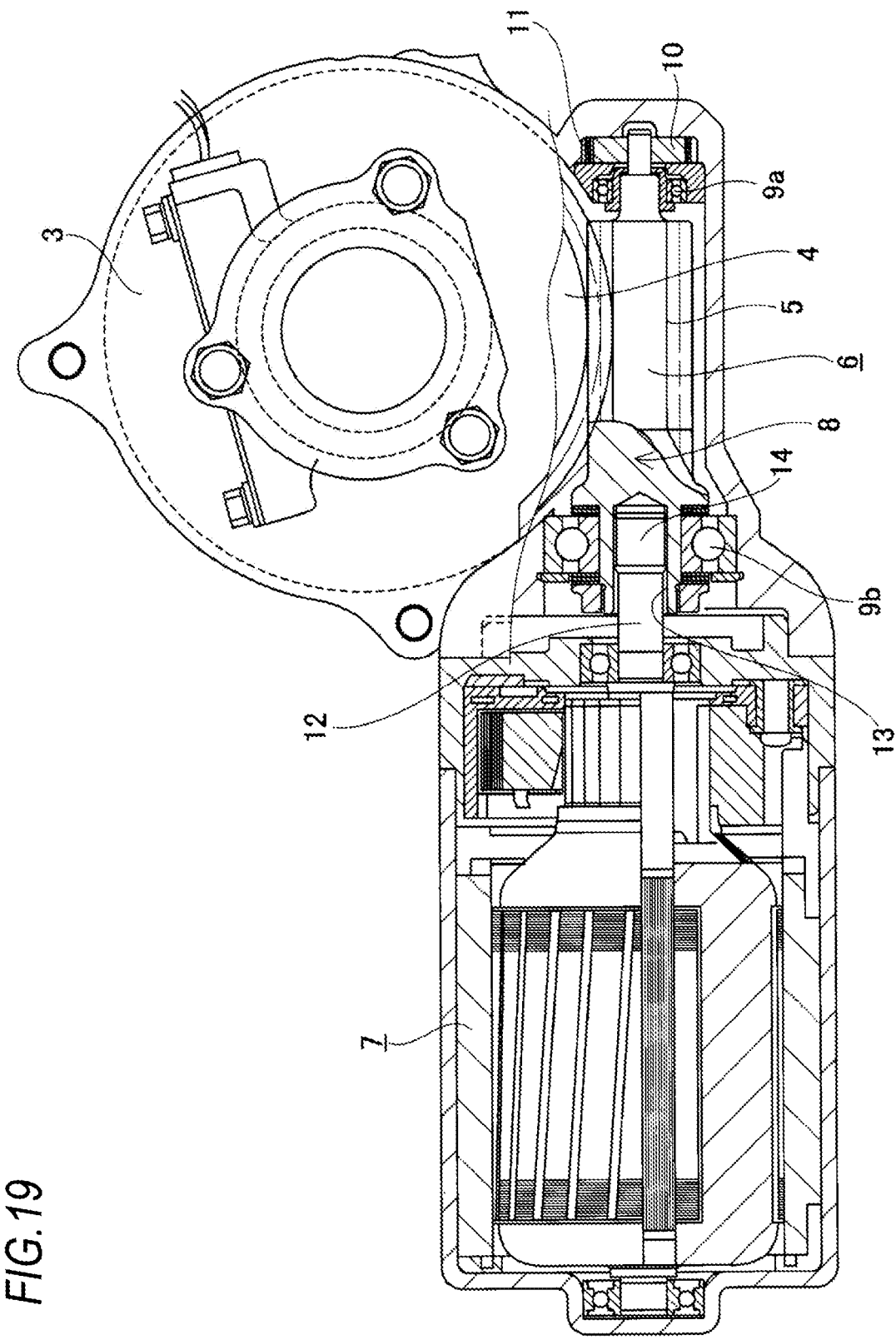
FIG. 19 is an enlarged sectional view taken along an M-M line of FIG. 18.

In an electric power steering device of the first embodiment, a front end portion of a steering shaft 2 to which a steering wheel 1 is attached at a rear end portion is rotatably supported in a housing 3, and a worm wheel 4 is fixed to a portion configured to rotate by the steering shaft 2, similarly to the conventional structure shown in FIGS. 18 and 19. Worm teeth 5 configured to mesh with the worm wheel 4 are provided on an axially intermediate portion of a worm shaft 6a, and both axial end portions of a worm 8 configured to rotate by an electric motor 7 are rotatably supported in the housing 3 by a pair of rolling bearings (ball bearings in the illustrated example) 9a, 9b. A preload applying mechanism 15 including an elastic body such as a coil spring or a leaf spring is provided between the housing 3 and the rolling bearing 9a externally fitted to a tip portion of the worm shaft 6a. The preload applying mechanism 15 presses the worm teeth 5 provided on the worm shaft 6a toward the worm wheel 4 based on an elastic force of the elastic body. By this configuration, backlash between the worm teeth 5 and the worm wheel 4 is suppressed to reduce generation of gear striking noise.

In the first embodiment, a tip portion of an output shaft (an example of a driving shaft) 12a of the electric motor 7 and a base end portion of the worm shaft (an example of a driven shaft) 6a, which are arranged in series in an axial direction, are coupled via a torque transmission joint 16 such that torque can be transmitted.

The torque transmission joint 16 includes a driving-side transmission member 17, a driven-side transmission member 18, an intermediate transmission member 19, a driving-side elastic member (an example of a divided member) 20 and a driven-side elastic member (an example of the divided member) 21.

In the present specification, in the torque transmission joint 16, "one axial side" refers to a right side in FIGS. 2 to 6, 8, 9, 12, and "the other axial side" refers to a left side in FIGS. 2 to 6, 8, 9 and 12.

The driving-side transmission member 17 is provided on the tip portion of the output shaft 12a. For example, as shown in FIG. 13, the driving side transmission member 17 is formed into an annular shape as a whole by a method such as injection molding, casting, forging, sintering, cutting or the like with a synthetic resin mixed with reinforcing fibers as necessary, or a metal such as an iron alloy, a copper alloy, an aluminum alloy or the like. The driving-side transmission member 17 is externally fitted to the tip portion of the output shaft 12 by interference fitting, spline fitting, crimping or the like with relative rotation and axial relative displacement being restricted. However, when implementing the present invention, the driving-side transmission member 17 may be formed integrally with the tip portion of the output shaft 12a.

A driving-side concave-convex portion 22 formed by alternately arranging concave portions 23 and convex portions 24 in a circumferential direction is provided on an outer periphery of the driving-side transmission member 17 from the other axial end portion to an axially intermediate portion (portion except for one axial end portion). A circular ring shaped driving-side collar portion 25 is provided at one axial end portion on the outer periphery of the driving-side transmission member 17 over an entire circumference thereof. One axial opening of the concave portion 23 configuring the driving-side concave-convex portion 22 is blocked by a positioning side surface 46a which is the other axial side surface of the driving-side collar portion 25.

Figure 15A:
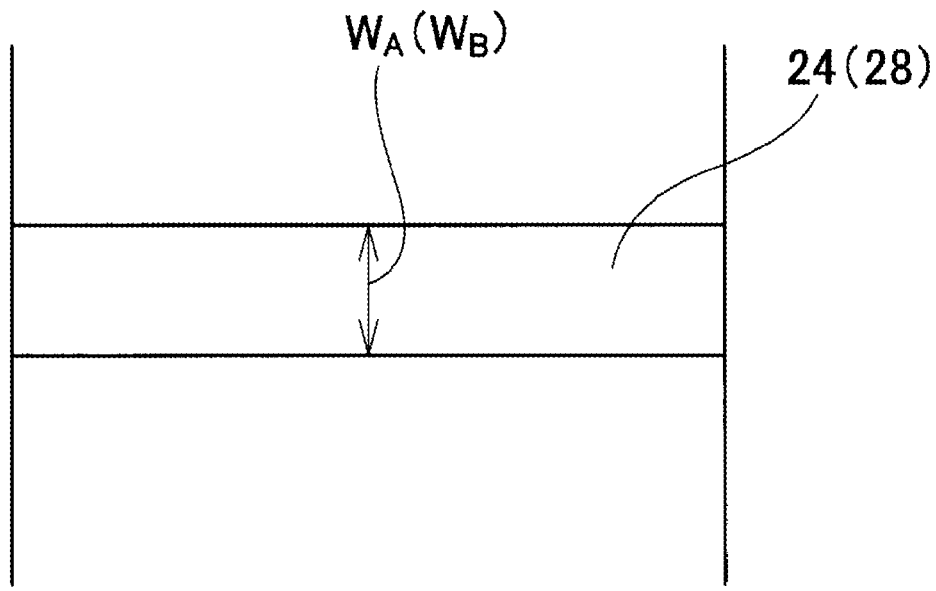
FIG. 15A and FIG. 15B are views showing two examples of a convex portion configuring a driving-side concave-convex portion (a driven-side concave-convex portion) as seen from the radially outside according to the first embodiment of the present invention.

In the first embodiment, both circumferential side surfaces of the convex portion 24 configuring the driving-side concave-convex portion 22 are configured as flat surfaces parallel with each other. That is, a circumferential width dimension $W_A$ of the convex portion 24 configuring the driving-side concave-convex portion 22 does not change in a radial direction, and as shown in FIG. 15A, the circumferential width dimension $W_A$ does not change in the axial direction either.

The driven-side transmission member 18 is provided on the base end portion of the worm shaft 6a. For example, as shown in FIG. 14, the driven-side transmission member 18 is formed into an annular shape as a whole by a method such as injection molding, casting, forging, sintering, cutting or the like with a synthetic resin mixed with reinforcing fibers as necessary, or a metal such as an iron alloy, a copper alloy, an aluminum alloy or the like. The driven-side transmission member 18 is externally fitted to the base end portion of the worm shaft 6a by interference fitting, spline fitting, crimping or the like with relative rotation and axial relative displacement being restricted. However, when implementing the present invention, the driven-side transmission member 18 may be formed integrally with the base end portion of the worm shaft 6a.

A driven-side concave-convex portion 26 formed by alternately arranging concave portions 27 and convex portions 28 in the circumferential direction is provided on an outer periphery of the driven-side transmission member 18 from one axial end portion to an axially intermediate portion (portion except for the other axial end portion). A circular ring shaped driven-side collar portion 29 is provided at one axial end portion on the outer periphery of the driven-side transmission member 18 over an entire circumference thereof. The other axial opening of the concave portion 27 configuring the driven-side concave-convex portion 26 is blocked by a positioning side surface 46b which is one axial side surface of the driven-side collar portion 29.

In the first embodiment, both circumferential side surfaces of the convex portion 28 configuring the driven-side concave-convex portion 26 are configured as flat surfaces parallel with each other. That is, a circumferential width dimension $W_B$ of the convex portion 28 configuring the driven-side concave-convex portion 26 does not change in the radial direction, and as shown in FIG. 15A, the circumferential width dimension $W_B$ does not change in the axial direction either.

In the first embodiment, the driving-side transmission member 17 and the driven-side transmission member 18 are formed in the same shape and the same size. Therefore, in the first embodiment, parts can be shared between the driving-side transmission member 17 and the driven-side transmission member 18.

As shown in FIG. 16, for example, the intermediate transmission member 19 is formed of a material (with higher rigidity) which is less elastically deformed than the elastic material configuring the driving-side elastic member 20 and the driven-side elastic member 21, and is formed into a annular shape as a whole by a method such as injection molding, casting, forging, sintering, cutting or the like with a belt material with reinforced rubber by cloth, a synthetic resin (PPS, PEEK, polyamide or the like) mixed with reinforcing fibers as necessary, or a metal such as an iron alloy, a copper alloy, an aluminum alloy or the like which satisfy such conditions.

The intermediate transmission member 19 includes a main body portion 30 having a cylindrical shape and an intermediate concave-convex portion 31 formed by alternately arranging concave portions 32 and convex portions 33 in the circumferential direction on an inner periphery of the main body portion 30.

On the both axial side surfaces of the main body portion 30, axial male side engagement portions 34a, 34b which have a fan shape as seen from the axial direction are respectively provided to protrude in the axial direction at portions corresponding to circumferential center portions of the both axial side surfaces of the adjacent convex portions 33, 33. Tip surfaces of the axial male side engagement portions 34a, 34b are configured as inclined side surface portions 35a, 35b having a convex curved surface shape inclined in a direction directed an axially inner side (an axially center side of the intermediate transmission member 19) as proceeding toward a radially outer side.

On the inner periphery of the main body portion 30, radial male side engagement portions 36a, 36b which have a rectangular shape as seen from a radially inner side are respectively provided to protrude in the radial direction at portions corresponding to one axial end portion or the other axial end portion of a circumferential center portion on a radially inner side surface of the adjacent convex portions 33, 33. In the first embodiment, phases of arrangement in the circumferential direction of the radial male side engagement portion 36a provided on one axial side and the radial male side engagement portion 36b provided on the other axial side are shifted from each other by a half pitch.

In the first embodiment, each of the radial male side engagement portions 36a, 36b is provided to be continuous with an adjacent axial male side engagement portion 34a, 34b respectively.

When implementing the present invention, the number of the radial male side engagement portions 36a (36b) on one axial side (the other axial side) may be less that the number in the present embodiment, or may also be more than the number in the present embodiment (for example, the same with the axial male side engagement portions 34a (34b)). The phases of arrangement of the radial male side engagement portion 36a on one axial side and the radial male side engagement portion 36b on the other axial side in the circumferential direction may be matched with each other.

Figure 17A:
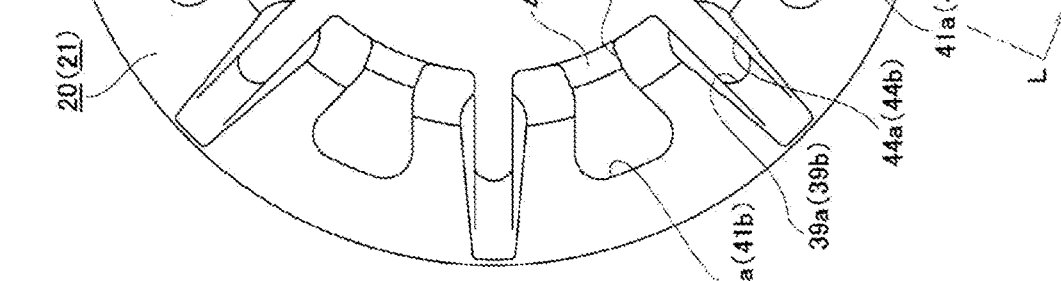
Figure 17B:
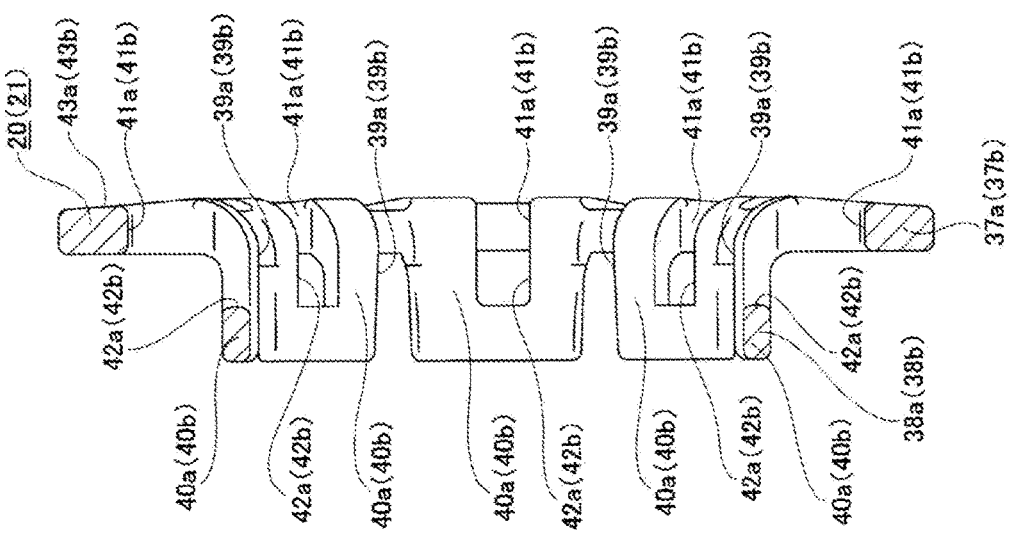

As shown in FIG. 17, for example, the driving-side elastic member 20 is formed into an annular shape as a whole by an elastic material such as rubber (NBR, HNBR or the like), elastomer (polyurethane, silicone or the like) or the like which has a rigidity lower than that of the intermediate transmission member 19. The driving-side elastic member 20 is assembled to one axial end portion of the intermediate transmission member 19. The driving-side elastic member 20 includes a circular ring shaped side surface covering portion 37a and a cylindrical shaped periphery covering portion 38a provided to extend from a radially inner end portion of the side surface cover portion 37a to the other axial side.

In the driving-side elastic member 20, elastic slits 39a opening to the other axial end edge are respectively provided at a plurality of positions which are in the same phase with the concave portions 32 configuring the intermediate concave-convex portion 31 in the circumferential direction, in a continuous range from a radially center portion of the side surface covering portion 37a to the other axial end edge (tip edge) of the periphery covering portion 38a. Therefore, in the first embodiment, the periphery covering portion 38a is configured by a plurality of periphery covering pieces 40a, 40a which is divided in the circumferential direction by the elastic slits 39a, 39a and each of which has a partial cylindrical shape.

In a radially inner half part of the side surface covering portion 37a, a hole-shaped axial female side engagement portion 41a capable of engaging with the axial male side engagement portion 34a provided on one axial side of the intermediate transmission member 19 without rattling is provided at a circumferential center portion of a part interposed between adjacent elastic slits 39a in the circumferential direction.

In one axial half part (base half part) of the periphery covering portion 38a, a hole-shaped radial female side engagement portion 42a capable of engaging with the radial male side engagement portion 36a provided on one axial side of the intermediate transmission member 19 without rattling is provided at a circumferential center portion of a part (one axial half part of each periphery covering piece 40a, 40a) interposed between adjacent elastic slits 39a, 39a in the circumferential direction to be continuous with the adjacent axial female side engagement portion 41.

One axial side surface (outer side surface) of the side surface covering portion 37a is configured as an inclined side surface portion 43a having a convex curved surface shape inclined in a direction directed the other axial side (which is an axially inner side, the axially center side of the intermediate transmission member 19) as proceeding toward the radially outer side.

On one axial side surface of the side surface covering portion 37a, a guide concave portion 44a which is recessed in the axial direction compared with a peripheral portion is provided in an opening peripheral edge portion of each elastic slit 39a, 39a to extend in a radiation direction.

Figure 1:
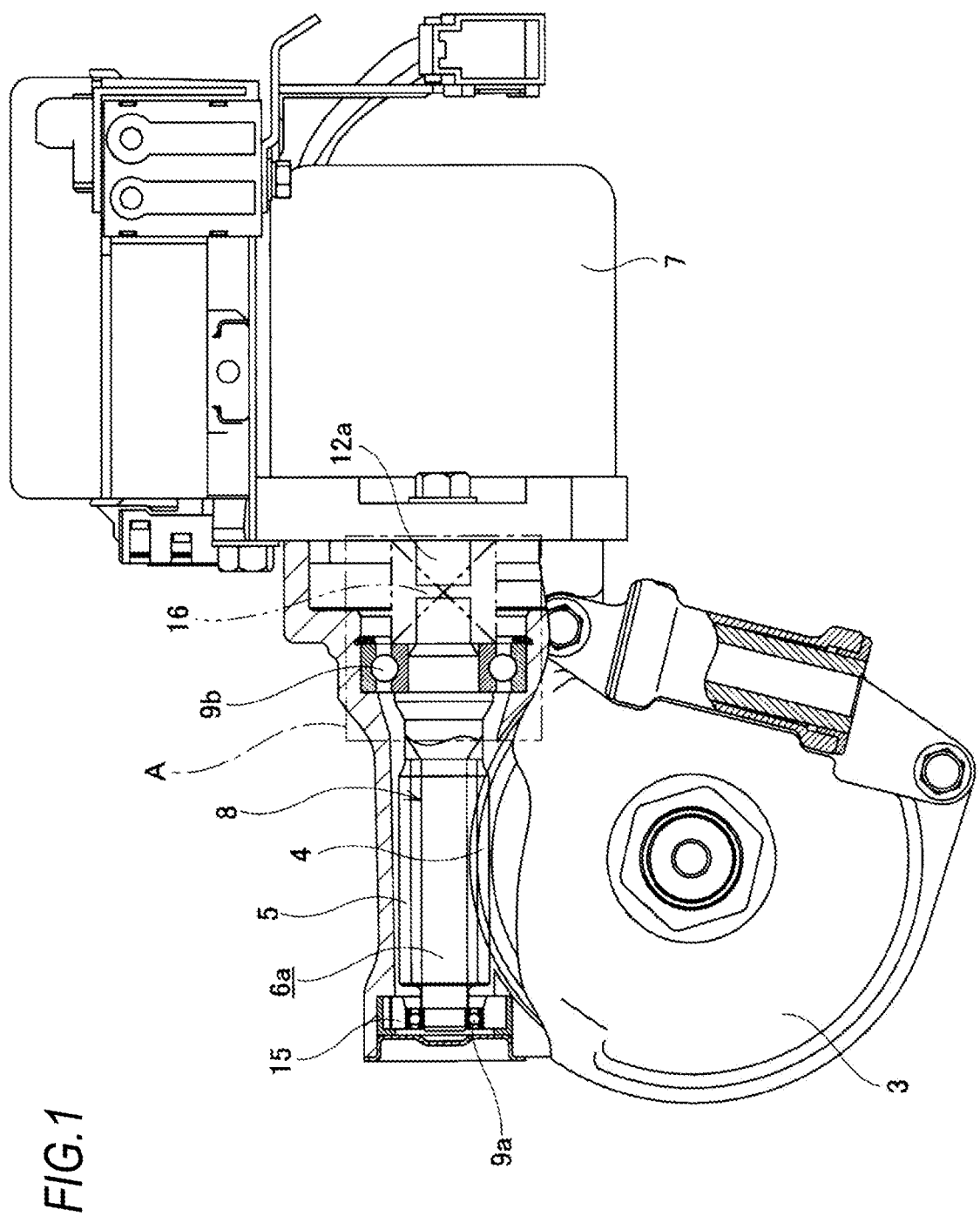
FIG. 1 is a similar view to FIG. 19 according to a first embodiment of the present invention.
Figure 2:
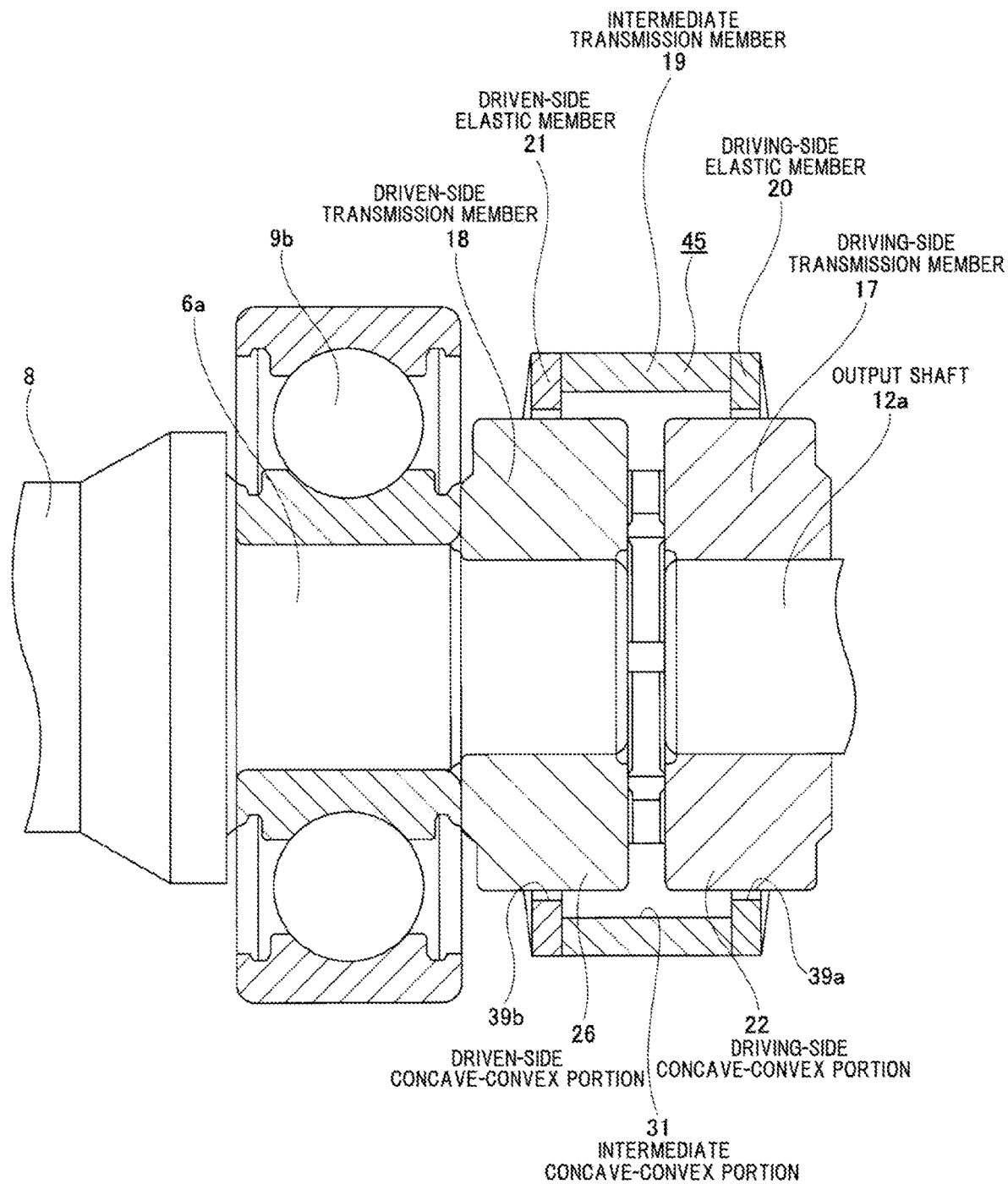
FIG. 2 is an enlarged view of an A part of FIG. 1 according to the first embodiment of the present invention.
Figure 3:
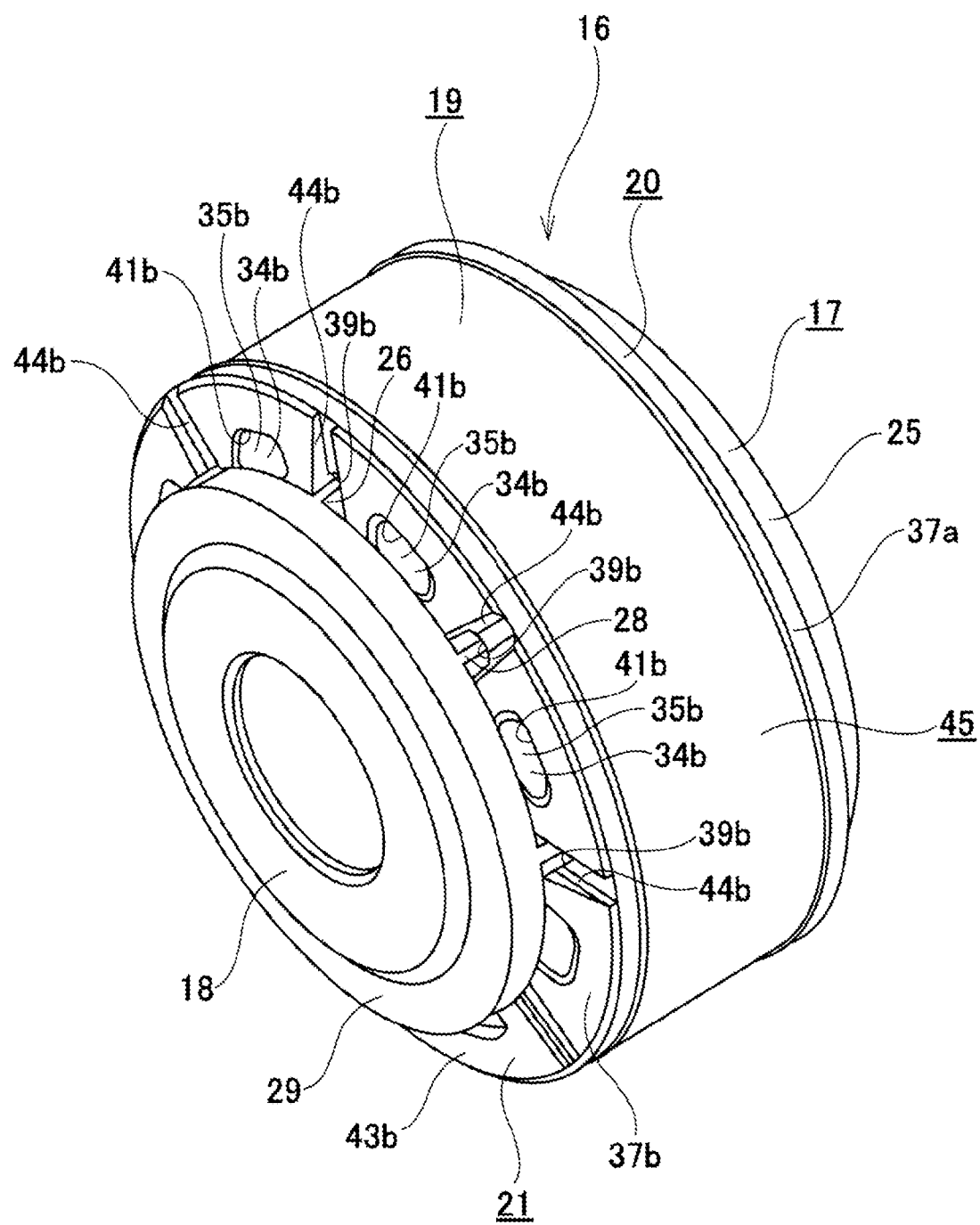
FIG. 3 is a perspective view of a torque transmission joint according to the first embodiment of the present invention.
Figure 4:
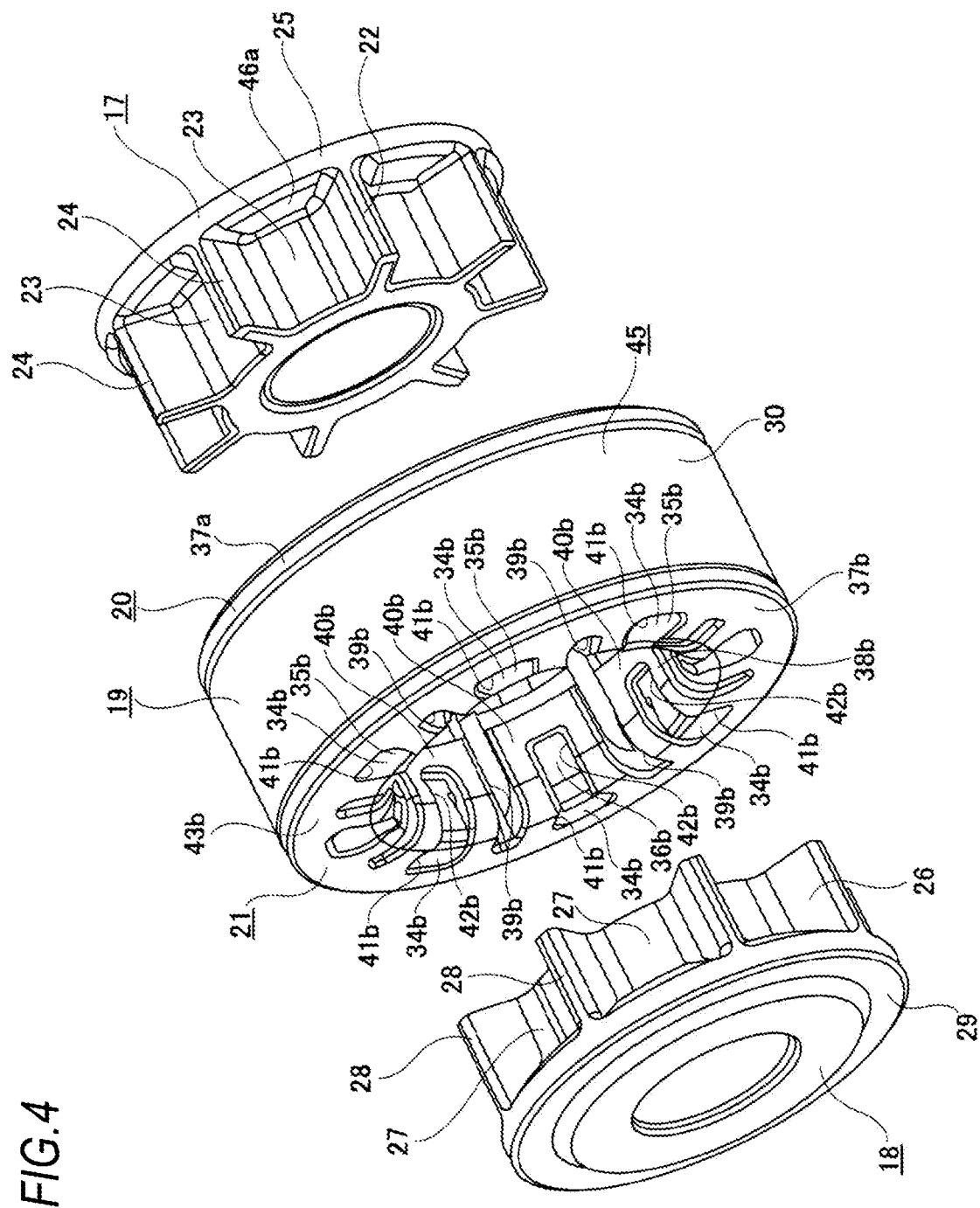
FIG. 4 is a partially exploded perspective view showing the torque transmission joint according to the first embodiment of the present invention.
Figure 5:
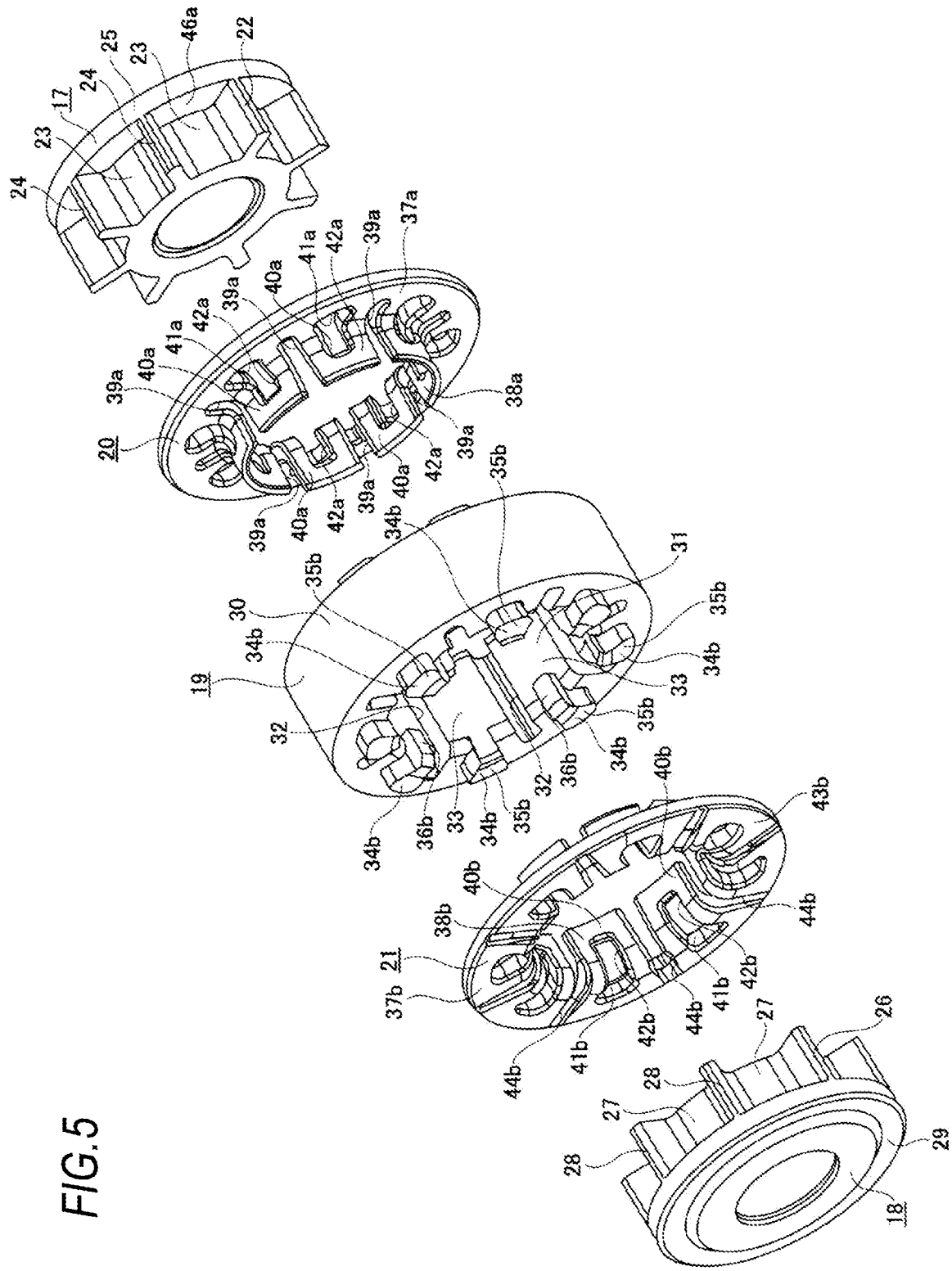
FIG. 5 is an entirely exploded perspective view showing the torque transmission joint according to the first embodiment of the present invention.
Figure 6:
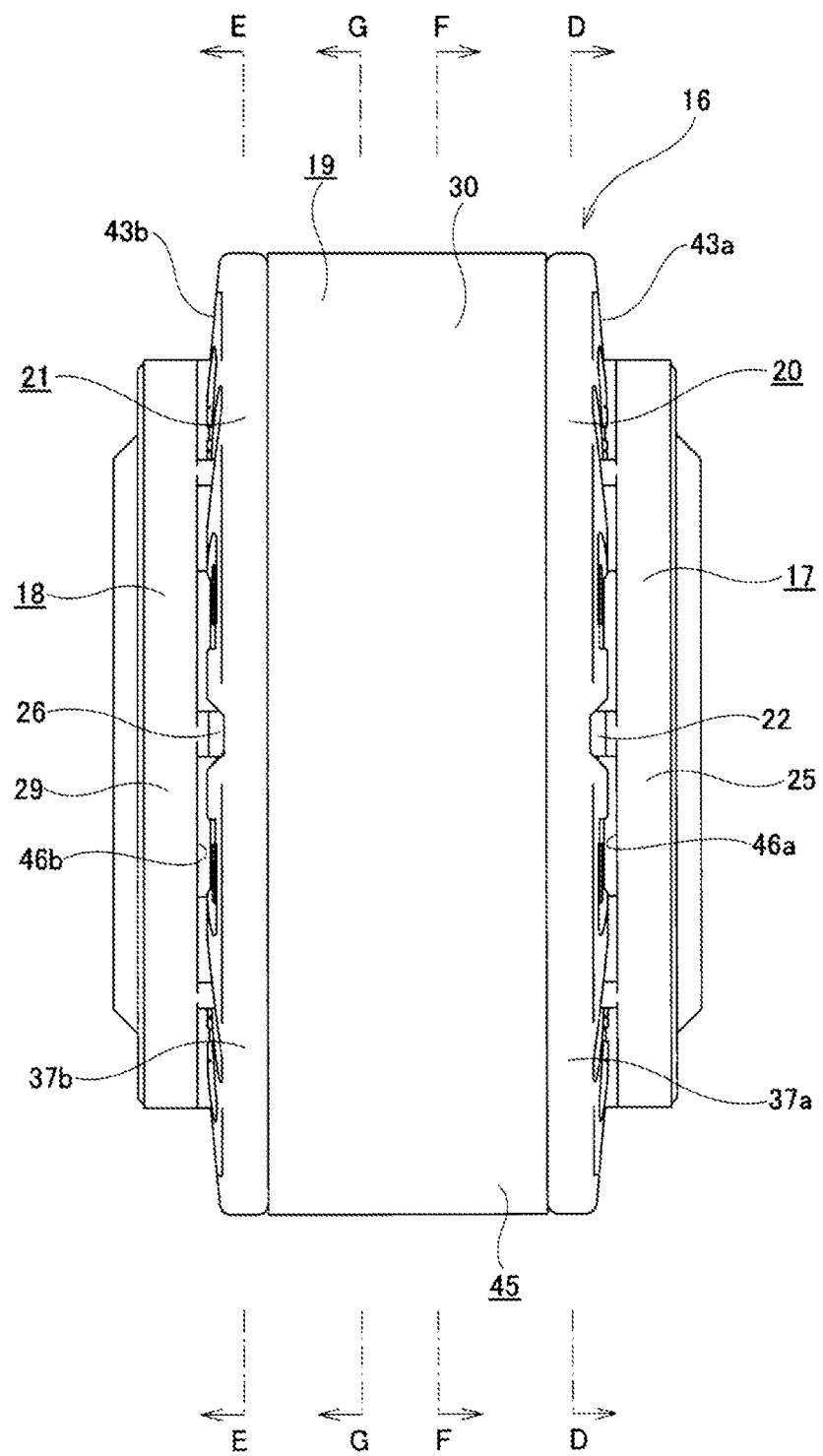
FIG. 6 is a view of the torque transmission joint as seen from radially outside according to the first embodiment of the present invention.
Figure 7:
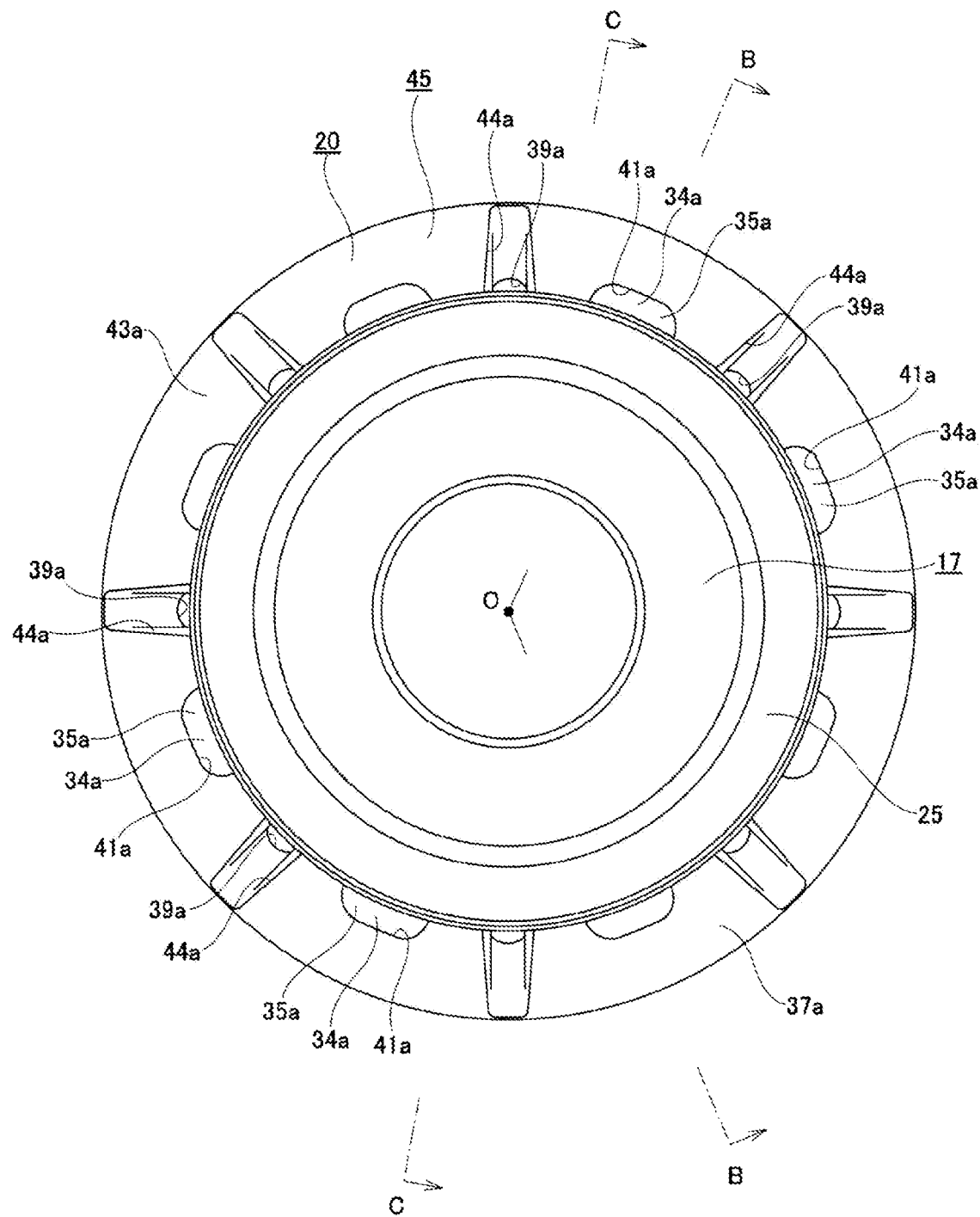
FIG. 7 is a view of the torque transmission joint as seen from an axial direction according to the first embodiment of the present invention.
Figure 8:
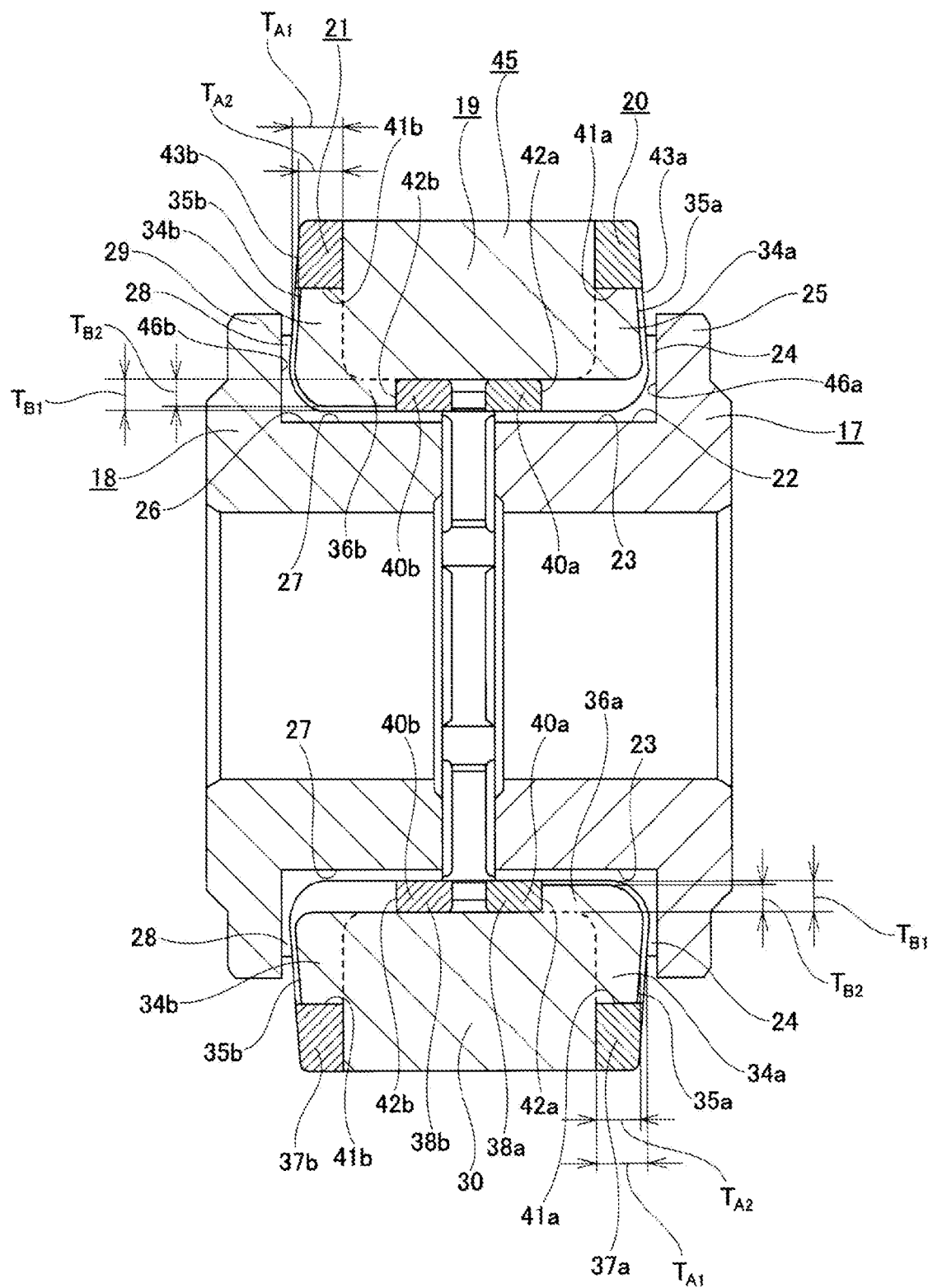
FIG. 8 is a sectional view taken along a B-O-B line of FIG. 7 according to the first embodiment of the present invention.
Figure 9:
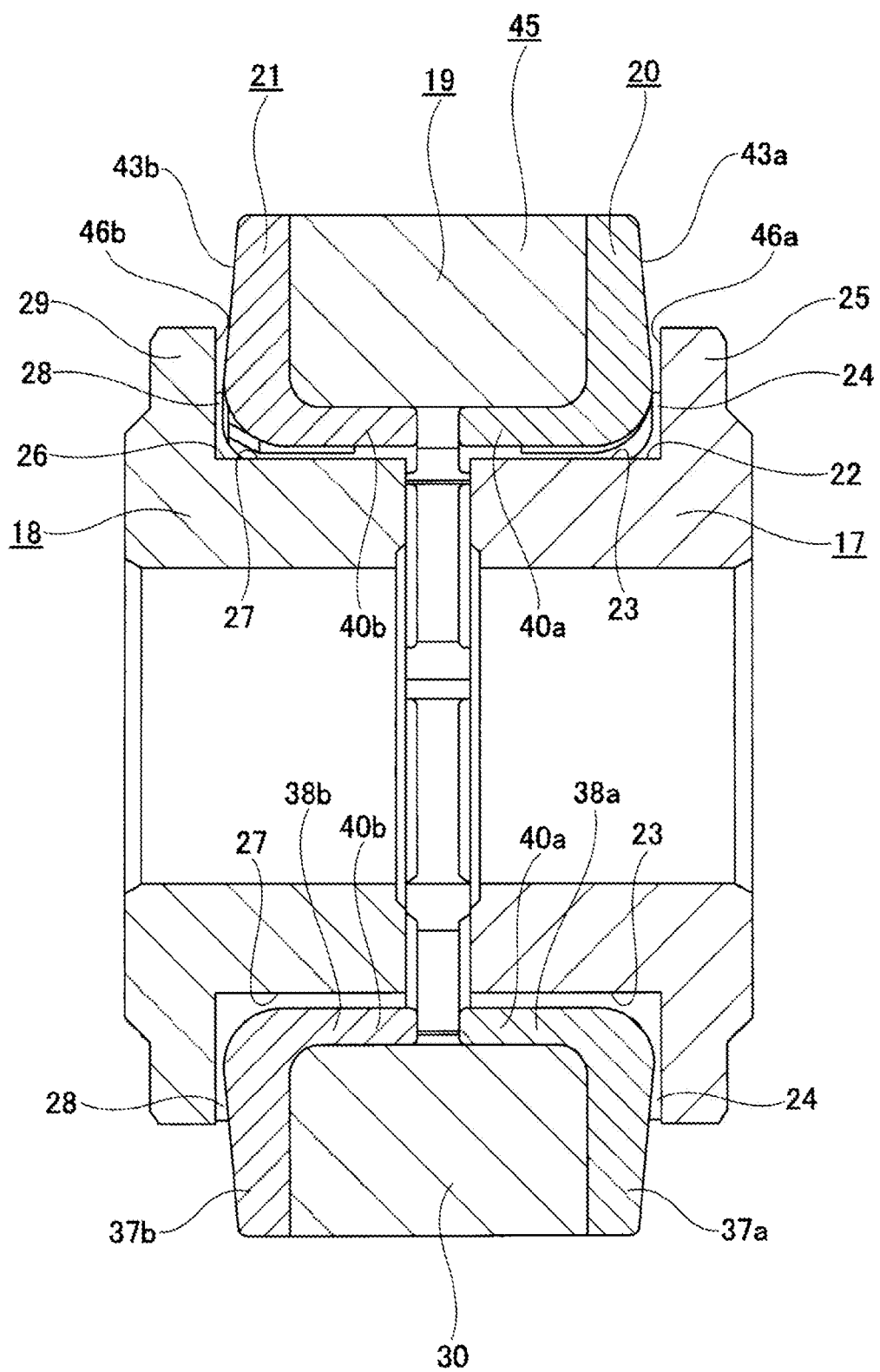
FIG. 9 is a sectional view taken along a C-C line of FIG. 7 according to the first embodiment of the present invention.
Figure 10:
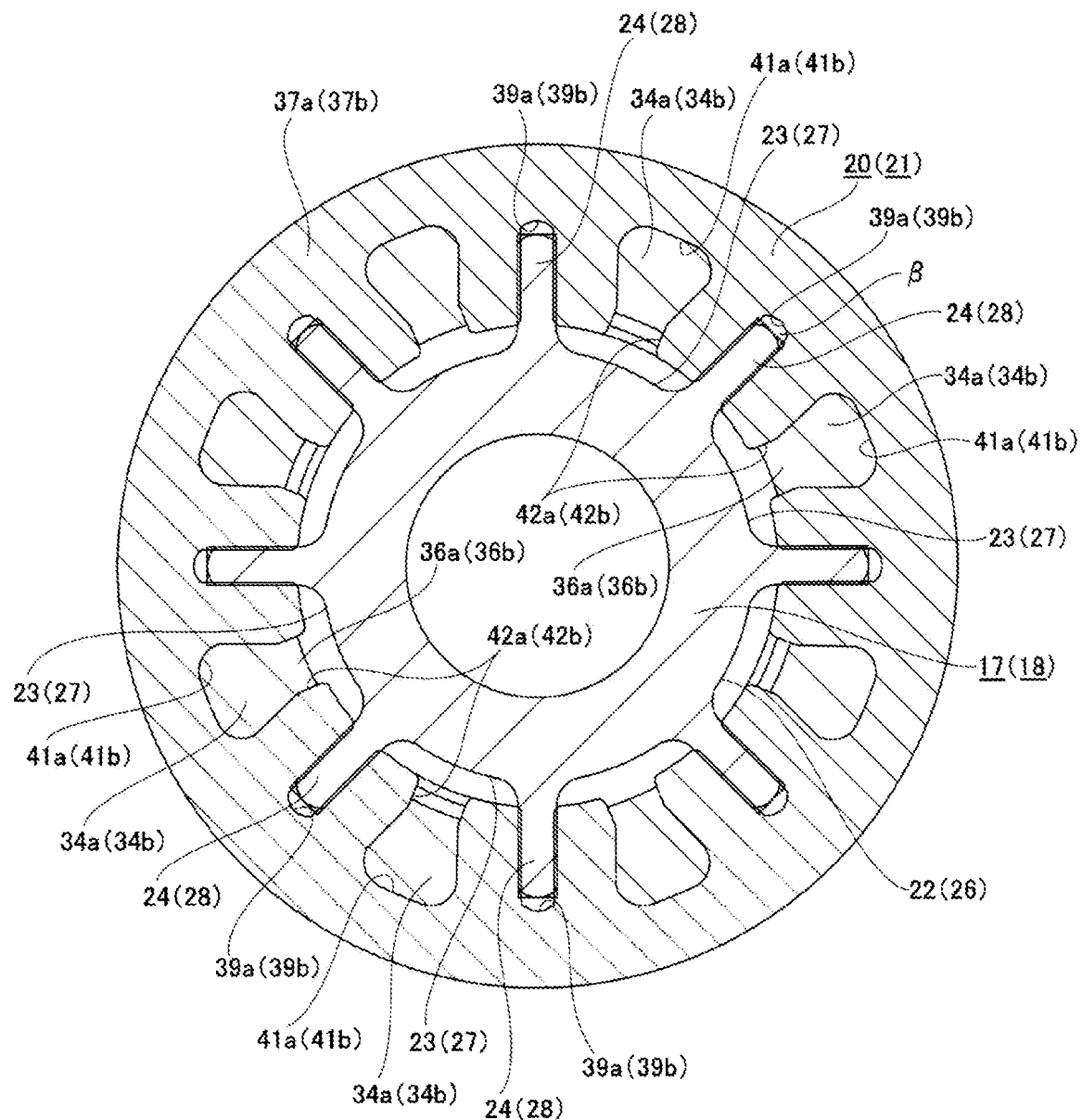
FIG. 10 is a sectional view taken along a D-D line (an E-E line) of FIG. 6 according to the first embodiment of the present invention.
Figure 11:
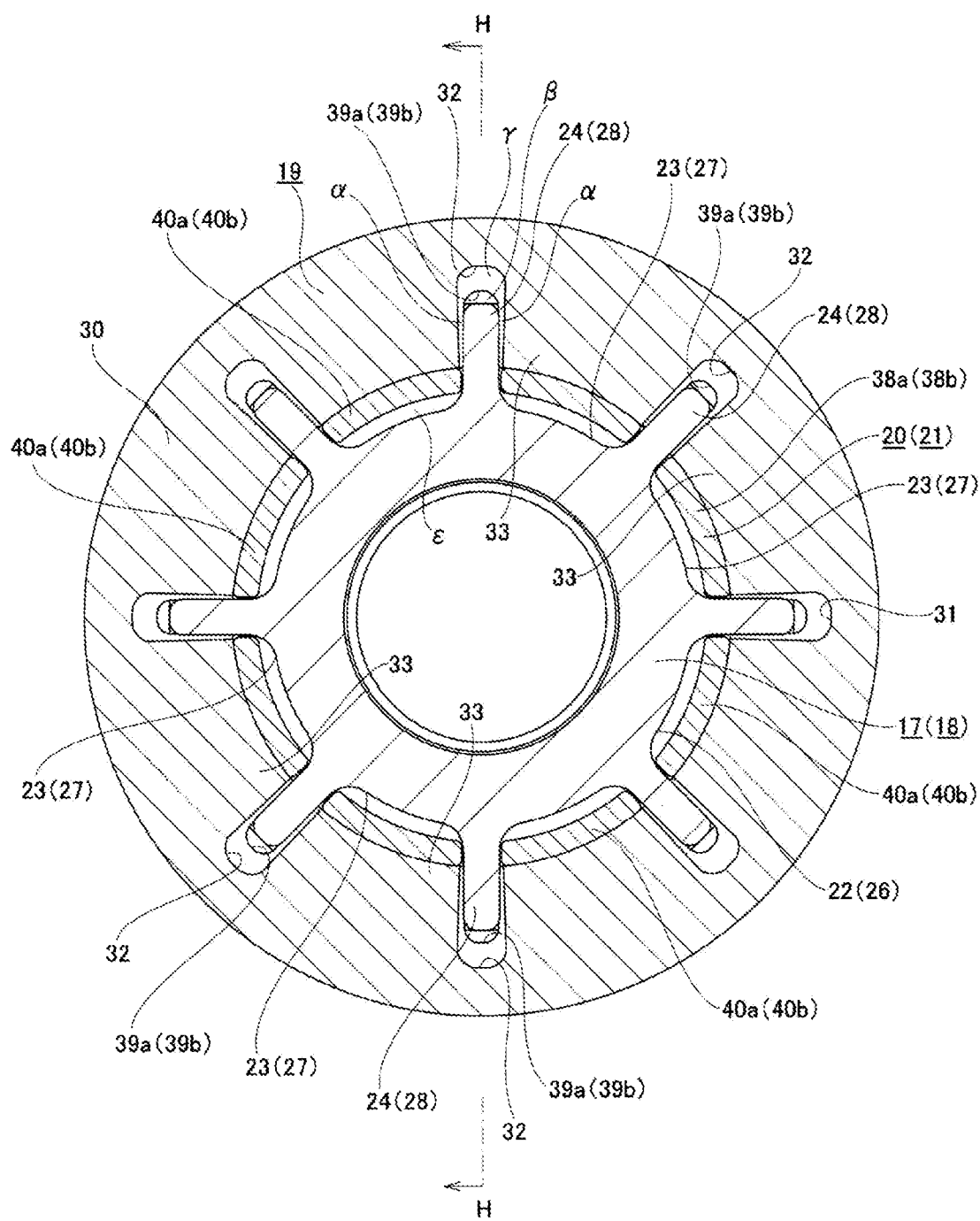
FIG. 11 is a sectional view taken along an F-F line (a G-G line) of FIG. 6 according to the first embodiment of the present invention.
Figure 12:
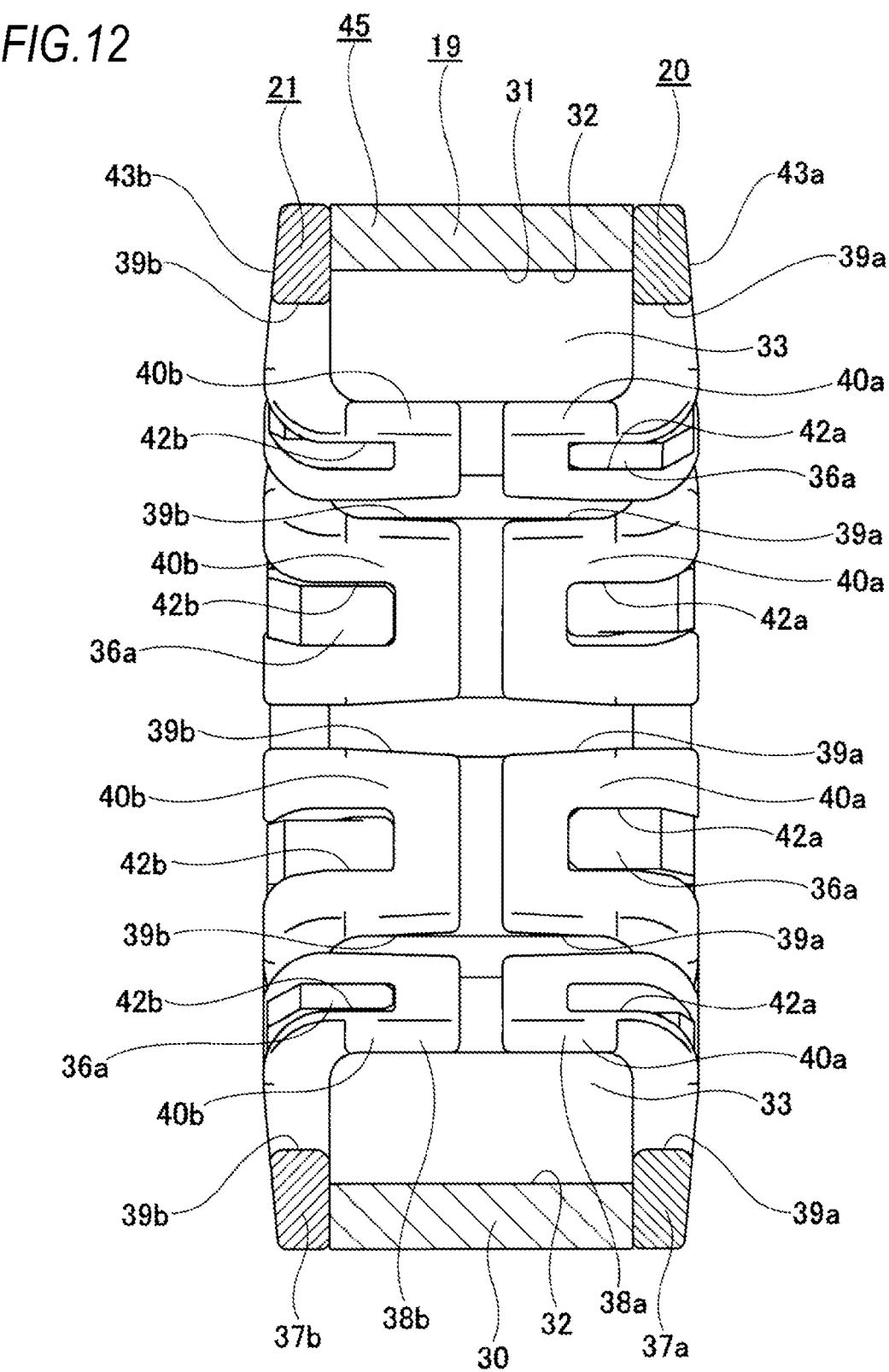
FIG. 12 is a sectional view taken along an H-H line of FIG. 11 with a driving-side transmission member and a driven-side transmission member omitted according to the first embodiment of the present invention omitted.

As shown in FIG. 8 for example, in a state where the driving-side elastic member 20 is assembled to one axial end portion of the intermediate transmission member 19, each axial male side engagement portion 34a, 34a provided on one axial side of the intermediate transmission member 19 is engaged with each axial female side engagement portion 41a, 41a without rattling in the circumferential direction and the radial direction. Further, the radial male side engagement portions 36a, 36a provided on one axial side of the intermediate transmission member 19 are engaged with some of the radial female side engagement portions 42a, 42a without rattling in the circumferential direction and the axial direction. Therefore, torque can be transmitted between the intermediate transmission member 19 and the driving-side elastic member 20, and separation therebetween can be prevented.

In this state, the side surface covering portion 37a is in contact with a portion of one axial side surface of the intermediate transmission member 19 (main body portion 30) which is displaced from each axial male side engagement portion 34a, 34a to cover that portion. Meanwhile, the periphery covering portion 38a (each periphery covering piece 40a, 40a) is in contact with a portion on one axial end portion of inner periphery (radially inner side surfaces of the convex portions 33, 33 configuring the intermediate concave-convex portion 31) of the intermediate transmission member 19 (main body portion 30) which is displaced from each radial male side engagement portion 36a, 36a to cover that portion.

In the first embodiment, an axial thickness dimension $T_{A1}$ of a portion in the side surface covering portion 37a which is at the same position as each axial male side engagement portion 34a, 34a in the radial direction is larger than an axial thickness dimension $T_{A2}$ of each axial male side engagement portion 34a, 34a ($T_{A1} > T_{A2}$). Accordingly, one axial side surface (outer side surface) of the side surface covering portion 37a is located on one axial side (outer side) of the tip surface (inclined side surface portion 35a, 35a) of each axial male side engagement portion 34a, 34a.

In the first embodiment, a radial thickness dimension $T_{B1}$ of the periphery covering portion 38a (each periphery covering piece 40a, 40a) is larger than a radial thickness dimension $T_{B2}$ of each radial male side engagement portion 36a, 36a ($T_{B1} > T_{B2}$). Accordingly, a radially inner side surface of the periphery covering portion 38a (each periphery covering piece 40a, 40a) is located on radially inner side of a radially inner side surface of each radial male side engagement portion 36a, 36a.

As shown in FIG. 17, for example, the driven-side elastic member 21 is formed into an annular shape as a whole by an elastic material such as rubber (NBR, HMBR or the like), elastomer (polyurethane, silicone or the like) or the like which has a rigidity lower than that of the intermediate transmission member 19. The driven-side elastic member 21 is assembled to the other axial end portion of the intermediate transmission member 19. The driven-side elastic member 21 includes a circular ring shaped side surface covering portion 37b and a cylindrical shaped periphery covering portion 38b provided to extend from a radially inner end portion of the side surface cover portion 37b to one axial side.

In the driven-side elastic member 21, elastic slits 39b opening to one axial end edge are provided at a plurality of positions which are in the same phase with the concave portions 32 configuring the intermediate concave-convex portion 31 in the circumferential direction, in a continuous range from a radially center portion of the side surface covering portion 37b to one axial end edge (tip edge) of the periphery covering portion 38b. Therefore, in the first embodiment, the periphery covering portion 38b is configured by a plurality of periphery covering pieces 40b, 40b which is divided in the circumferential direction by the elastic slits 39b, and each of which has a partial cylindrical shape.

In a radially inner half part of the side surface covering portion 37b, a hole-shaped axial female side engagement portion 41b capable of engaging with the axial male side engagement portion 34b provided on the other axial side of the intermediate transmission member 19 without rattling is provided at a circumferential center portion of a part sandwiched between adjacent elastic slits 39b in the circumferential direction.

In the other axial half part (base half part) of the periphery covering portion 38b, a hole-shaped radial female side engagement portion 42b capable of engaging with the radial male side engagement portion 36b provided on the other axial side of the intermediate transmission member 19 without rattling is provided at a circumferential center portion of a part (the other axial half part of each periphery covering piece 40b, 40b) interposed between adjacent elastic slits 39b, 39b in the circumferential direction to be continuous with the adjacent axial female side engagement portion 41b.

The other axial side surface (outer side surface) of the side surface covering portion 37b is configured as an inclined side surface portion 43b having a convex curved surface shape inclined in a direction directed one axial side (which is an axially inner side, the axially center side of the intermediate transmission member 19) as proceeding toward the radially outer side.

On the other axial side surface of the side surface covering portion 37b, a guide concave portion 44b which is recessed in the axial direction compared with a peripheral portion is provided in an opening peripheral edge portion of each elastic slit 39b, 39b to extend in a radiation direction.

As shown in FIG. 8 for example, in a state where the driven-side elastic member 21 is assembled to the other axial end portion of the intermediate transmission member 19, each axial male side engagement portion 34b, 34b provided on the other axial side of the intermediate transmission member 19 is engaged with each axial female side engagement portion 41b, 41b without rattling in the circumferential direction and the radial direction. Further, the radial male side engagement portions 36b, 36b provided on the other axial side of the intermediate transmission member 19 are engaged with some of the radial female side engagement portions 42b, 42b without rattling in the circumferential direction and the axial direction. Therefore, torque can be transmitted between the intermediate transmission member 19 and the driven-side elastic member 21, and separation therebetween can be prevented.

In this state, the side surface covering portion 37b is in contact with a portion of the other axial side surface of the intermediate transmission member 19 (main body portion 30) which is displaced from each axial male side engagement portion 34b, 34b to cover that portion. Meanwhile, the periphery covering portion 38b (each periphery covering piece 40b, 40b) is in contact with a portion on the other axial end portion of the inner periphery (radially inner side surfaces of the convex portions 33, 33 configuring the intermediate concave-convex portion 31) of the intermediate transmission member 19 (main body portion 30) which is displaced from each radial male side engagement portion 36b, 36b to cover that portion.

In the first embodiment, an axial thickness dimension $T_{A1}$ of a portion in the side surface covering portion 37b which is at the same position as each axial male side engagement portion 34b, 34b in the radial direction is larger than an axial thickness dimension $T_{A2}$ of each axial male side engagement portion 34b, 34b ($T_{A1}>T_{A2}$). Accordingly, the other axial side surface (outer side surface) of the side surface covering portion 37b is located on the other axial side (outer side) of the tip surface (inclined side surface portion 35b, 35b) of each axial male side engagement portion 34b, 34b.

In the first embodiment, a radial thickness dimension $T_{B1}$ of the periphery covering portion 38b (each periphery covering piece 40b, 40b) is larger than a radial thickness dimension $T_{B2}$ of each radial male side engagement portion 36b, 36b ($T_{B1}>T_{B2}$). Accordingly, a radially inner side surface of the periphery covering portion 38b (each periphery covering piece 40b, 40b) is located on radially inner side of a radially inner side surface of each radial male side engagement portion 36b, 36b.

In the first embodiment, the driving-side elastic member 20 and the driven-side elastic member 21 are formed in the same shape and the same size. Therefore, in the first embodiment, parts can be shared between the driving-side elastic member 20 and the driven-side elastic member 21.

As can be seen from the above description, in the first embodiment, both axial side surfaces of a coupling body 45 of the intermediate transmission member 19, the driving-side elastic member 20 and the driven-side elastic member 21 include the inclined side surface portions (35a, 43a,) (35b, 43b) which are inclined in a direction directed the axially inner side as proceeding toward the radially outer side.

In the first embodiment, when the coupling body 45 is assembled, the other axial end portion to the axially center portion of the driving-side transmission member 17 is inserted from one axial side to the radially inner side of one axial end portion of the coupling body 45.

Accordingly, the convex portion 24 configuring the driving-side concave-convex portion 22 is engaged with the elastic slit 39a provided on the driving-side elastic member 20 without a circumferential gap being interposed therebetween, and the driving-side concave-convex portion 22 is engaged with one axial end portion of the intermediate concave-convex portion 31 which is provided on the intermediate transmission member 19 with a circumferential gap being interposed therebetween. That is, in this state, both circumferential side surfaces of the convex portion 24 configuring the driving-side concave-convex portion 22 are respectively in contact with both circumferential inner side surfaces of the elastic slit 39a. On the other hand, the circumferential side surfaces the convex portion 24 configuring the driving-side concave-convex portion 22 and the convex portion 33 configuring the intermediate concave-convex portion 31 are not in contact with each other, and a circumferential gap α, α is provided between the circumferential side surfaces. The positioning side surface 46a which is the other axial side surface of the driving-side collar portion 25 is closely facing or in contact with (closely facing in the illustrated example) one axial side surface (inclined side surface portion 43a which is one axial side surface of the side surface covering portion 37a) of the coupling body 45, so that the driving-side transmission member 17 is positioned in the axial direction with respect to the coupling body 45.

In the first embodiment, in this state, a radial gap β is interposed between a radially outer end surface of the convex portion 24 configuring the driving-side concave-convex portion 22 and a bottom surface of the elastic slit 39a, and a radial gap γ is interposed between the radially outer end surface of the convex portion 24 configuring the driving-side concave-convex portion 22 and a bottom surface of the concave portion 32 configuring the intermediate concave-convex portion 31. Further, a radial gap ε is interposed between a bottom surface of the concave portion 23 configuring the driving-side concave-convex portion 22 and an inner periphery (radially inner side surfaces of the periphery covering pieces 40a, 40a) of the periphery covering portion 38a configuring the driving-side elastic member 20. In the first embodiment, the radial gap β and the radial gap ε are substantially equal to each other (β≈ε), and the radial gap γ is larger than the radial gap β and the radial gap ε (γ>β, γ>ε).

In the first embodiment, when the coupling body 45 is assembled, one axial end portion to the axially center portion of the driven-side transmission member 18 is inserted from the other axial side to the radially inner side of the other axial end portion of the coupling body 45.

Accordingly, the convex portion 28 configuring the driven-side concave-convex portion 26 is engaged with the elastic slit 39*b* provided on the driven-side elastic member 21 without a circumferential gap being interposed therebetween, and the driven-side concave-convex portion 26 is engaged with the other axial end portion of the intermediate concave-convex portion 31 which is provided on the intermediate transmission member 19 with a circumferential gap being interposed therebetween. That is, in this state, both circumferential side surfaces of the convex portion 28 configuring the driven-side concave-convex portion 26 are respectively in contact with both circumferential inner side surfaces of the elastic slit 39*b*. On the other hand, the circumferential side surfaces the convex portion 28 configuring the driven-side concave-convex portion 26 and the convex portion 33 configuring the intermediate concave-convex portion 31 are not in contact with each other, and a circumferential gap α, α is provided between the circumferential side surfaces. The positioning side surface 46*b* which is one axial side surface of the driven-side collar portion 29 is closely facing or in contact with (closely facing in the illustrated example) the other axial side surface (inclined side surface portion 43*b* which is the other axial side surface of the side surface covering portion 37*b*) of the coupling body 45, so that the driven-side transmission member 18 is positioned in the axial direction with respect to the coupling body 45.

In the first embodiment, in this state, a radial gap β is interposed between a radially outer end surface of the convex portion 28 configuring the driven-side concave-convex portion 26 and a bottom surface of the elastic slit 39*b*, and a radial gap γ is interposed between the radially outer end surface of the convex portion 28 and the bottom surface of the concave portion 32 configuring the intermediate concave-convex portion 31. Further, a radial gap ε is interposed between a bottom surface of the concave portion 27 configuring the driven-side concave-convex portion 26 and an inner periphery (radially inner side surfaces of the periphery covering pieces 40*b*, 40*b*) of the periphery covering portion 38*b* configuring the driven-side elastic member 21. In the first embodiment, the radial gap β and the radial gap ε are substantially equal to each other (β≈ε), and the radial gap γ is larger than the radial gap β and the radial gap ε (γ>β, γ>ε).

According to the electric power steering device of the first embodiment, when torque to be transmitted between the output shaft 12*a* of the electric motor 7 and the worm 8 is relatively low, rotation torque of the output shaft 12*a* is transmitted from the engagement portion between the second driving-side concave-convex portion 22 (convex portion 24) of the driving-side transmission member 17 and the elastic slit 39*a* of the driving-side elastic member 20 to the driving-side elastic member 20, and then transmitted from the engagement portion between the axial female side engagement portion 41*a* as well as the radial female side engagement portion 42*a* which configure the driving-side elastic member 20, and the axial male side engagement portion 34*a* on one axial side as well as the radial male side engagement portion 36*a* which configure the intermediate transmission member 19 to the intermediate transmission member 19. The torque transmitted to the intermediate transmission member 19 is transmitted from the engagement portion between the axial male side engagement portion 34*b* on the other axial side as well as the radial male side engagement portion 36*b* which configure the intermediate transmission member 19, and the axial female side engagement portion 41*b* as well as the radial female side engagement portion 42*b* which configure the driven-side elastic member 21 to the driven-side elastic member 21, and then transmitted from the engagement portion between the elastic slit 39*b* of the driven-side elastic member 21 and the driven-side concave-convex portion 26 (convex portion 28) of the driven-side transmission member 18 to the worm 8.

In contrast, when the torque to be transmitted between the output shaft 12*a* and the worm 8 increases, a part of the driving-side elastic member 20 and a part of the driven-side elastic member 21 are elastically deformed in the circumferential direction between the convex portion 24 configuring the driving-side concave-convex portion 22 and the axial male side engagement portion 34*a*, and between the convex portion 28 configuring the driven-side concave-convex portion 26 and the axial male side engagement portion 34*b*. The convex portion 24 configuring the driving-side concave-convex portion 22 and the convex portion 28 configuring the driven-side concave-convex portion 26 are coming into contact with respective circumferential side surfaces of the convex portion 33 configuring the intermediate concave-convex portion 31. Since the contact forces are weakened by the elastic deformation of the parts of the driving-side elastic member 20 and the driven-side elastic member 21, generation of the abnormal noise to be caused as the contact occurs can be suppressed. At this state, most of the rotation torque of the output shaft 12*a* is transmitted from the engagement portion between the driving-side concave-convex portion 22 and the intermediate concave-convex portion 31 to the intermediate transmission member 19, and most of the torque transmitted to the intermediate transmission member 19 is transmitted from the engagement portion between the intermediate concave-convex portion 31 and the driven-side concave-convex portion 26 to the worm 8 (the remaining torque is transmitted from the output shaft 12*a* to the worm 8 as in the case where the torque is relatively low described above).

Further, in the first embodiment, even when a rotational direction of the output shaft 12*a* of the electric motor 7 is reversed, contact forces between the convex portion 24 configuring the driving-side concave-convex portion 22 as well as the convex portion 28 configuring the driven-side concave-convex portion 26 and the respective circumferential side surfaces of the convex portion 33 configuring the intermediate concave-convex portion 31 are weakened by the elastic deformation of the driving-side elastic member 20 and the driven-side elastic member 21, so that generation of the abnormal noise to be caused as the contact occurs can be suppressed.

As described above, in the electric power steering device of the first embodiment, the torque transmission between the output shaft 12*a* and the worm 8 is performed via the torque transmission joint 16, so that it is possible to divide the transmission characteristic of the torque into two stages in accordance with the magnitude of the torque to be transmitted. In other words, in the first embodiment, torsional rigidity of the torque transmission joint 16 has two-stage characteristics in which the torsional rigidity can be made low when the torque to be transmitted is low, and the torsional rigidity can be made high when the torque to be transmitted is high. Therefore, it is possible to make the operational feeling of the steering wheel 1 favorable.

That is, in general, when vibrational torque is applied to a portion where the worm wheel 4 is fixed from a wheel side due to rough road surface or the like, the electric power steering device detects the torque and generates torque in a direction of canceling the torque by the electric motor 7. Accordingly, the vibrational torque (torque to be transmitted to the steering wheel 1 through the steering shaft 2) can be cancelled.

Herein, the worm 8 configured to mesh with the worm wheel 4 tends to rotate by a reactive force of the vibrational torque applied to the worm wheel 4. However, when a resistance (torsional rigidity of the torque transmission joint 16) against the relative rotation between the worm 8 and the output shaft 12a of the electric motor 7 is high, a rotation resistance of the worm 8 increases.

Meanwhile, since the vibrational torque, which is to be applied to the worm wheel 4, is relatively low as described above, the operational feeling of the steering wheel 1 may be deteriorated when the rotation resistance of the worm 8 is high.

However, in the first embodiment, torsional rigidity of the torque transmission joint 16 has two-stage characteristics in which the torsional rigidity can be made low when the torque to be transmitted is low, and the torsional rigidity can be made high when the torque to be transmitted is high. Therefore, it is possible to prevent occurrence of the above-described problem and make the operational feeling of the steering wheel 1 favorable.

In the meantime, when the circumferential gap of the engagement portion between the driving-side concave-convex portion 22 and the intermediate concave-convex portion 31 is different from the circumferential gap between the driven-side concave-convex portion 26 and the intermediate concave-convex portion 31, or when the elasticity of the driving-side elastic member 20 is different from the elasticity of the driven-side elastic member 21, or when circumferential gaps are provided at the engagement portion between the driving-side concave-convex portion 22 and the elastic slit 39a of the driving-side elastic member, and at the engagement portion between the driven-side concave-convex portion 26 and elastic slit 39b of the driven-side elastic member 21, respectively, and when the circumferential gaps are different from each other, it is possible to divide the transmission characteristic (torsional rigidity of the torque transmission joint 16) of the torque between the output shaft 12a and the worm 8 into more stages than the two stages. The relationship of the size of the circumferential gaps may be appropriately adjusted according to the purpose.

In the first embodiment, the radial gaps $\beta$, $\gamma$ and $\epsilon$ are respectively interposed at the engagement portion between the driving-side concave-convex portion 22 and the intermediate concave-convex portion 31 and the engagement portion between the driving-side concave-convex portion 22 and the driving-side elastic member 20. Further, one axial side surface of the coupling body 45 is inclined side surface portions 35a, 43a which are inclined in a direction directed the axially inner side as proceeding toward the radially outer side. Therefore, the inclination between center axes of the driving-side transmission member 17 and the coupling body 45 can be easily received.

In the first embodiment, the radial gaps $\beta$, $\gamma$ and $\epsilon$ are respectively interposed at the engagement portion between the driven-side concave-convex portion 26 and the intermediate concave-convex portion 31 and the engagement portion between the driven-side concave-convex portion 26 and the driven-side elastic member 21. Further, the other axial side surface of the coupling body 45 is inclined side surface portions 35b, 43b which are inclined in a direction directed the axially inner side toward the radially outer side. Therefore, the inclination between center axes of the driven-side transmission member 18 and the coupling body 45 can be easily received.

Therefore, in the first embodiment, even if misalignment (shaft deviation or eccentricity of the output shaft 12a of the electric motor 7, and shaft deviation or inclination or eccentricity of the worm shaft 6a) occurs, the center axis of the coupling body 45 easily inclines to the center axes of the driving-side transmission member 17 and the driven-side transmission member 18, so that torque transmission can be performed smoothly.

As described above, in the first embodiment, one axial side surface of the main body portion 30 configuring the intermediate transmission member 19 is covered by the side surface covering portion 37a configuring the driving-side elastic member 20, and one axial side surface (outer side surface) of the side surface covering portion 37a is located on one axial side (outer side) of the tip surface of each axial male side engagement portion 34a, 34a. Further, the other axial side surface of the main body portion 30 configuring the intermediate transmission member 19 is covered by the side surface covering portion 37b configuring the driven-side elastic member 21, and the other axial side surface (outer side surface) of the side surface covering portion 37b is located on the other axial side (outer side) of the tip surface of each axial male side engagement portion 34b, 34b.

Accordingly, when eccentricity, inclination or the like occurs between the driving-side transmission member 17 and the driven-side transmission member 18, the positioning side surface 46a which is the other axial side surface of the driving-side collar portion 25 comes into contact with one axial side surface (outer side surface) of the side surface covering portion 37a, so as to be prevented from coming into contact with one axial side surface of the main body portion 30 or the tip surface of the axial male side engagement portion 34a. Also, the positioning side surface 46b which is one axial side surface of the driven-side collar portion 29 comes into contact with the other axial side surface (outer side surface) of the side surface covering portion 37b, so as to be prevented from coming into contact with the other axial side surface of the main body portion 30 or the tip surface of the axial male side engagement portion 34b.

In this case, even if the side surface covering portion 37a (37b) is elastically deformed and the positioning side surface 46a (46b) comes into contact with the tip surface of the axial male side engagement portion 34a (34b), the contact forces are weakened by the elastic deformation of the side surface covering portion 37a (37b), so that generation of the abnormal noise to be caused as the contact occurs can be suppressed.

As described above, in the first embodiment, one axial end portion (a portion facing the bottom surface of the concave portion 23, 23 configuring the driving-side concave-convex portion 22 in the radial direction) of the inner periphery (radially inner side surface of the convex portion 33, 33 configuring the intermediate concave-convex portion 31) of the intermediate transmission member 19 is covered by periphery covering portion 38a (each periphery covering piece 40a, 40a) of the driving-side elastic member 20. The radially inner side surface of the periphery covering portion 38a (each periphery covering piece 40a, 40a) is located on the radially inner side of the radially inner side surface of each radial male side engagement portion 36a, 36a. The other axial end portion (a portion facing the bottom surface of the concave portion 27, 27 configuring the driven-side concave-convex portion 26 in the radial direction) of the inner periphery (radially inner side surface of the convex portion 33, 33 configuring the intermediate concave-convex portion 31) of the intermediate transmission member 19 is covered by periphery covering portion 38b (each periphery covering piece 40b, 40b) of the driven-side elastic member 21. The radially inner side surface of the periphery covering portion 38b (each periphery covering piece 40b, 40b) is located on the radially inner side of the radially inner side surface of each radial male side engagement portion 36b, 36b. The radial gap β between the radially outer end surface of the convex portion 24 configuring the driving-side concave-convex portion 22 and the bottom surface of the elastic slit 39a is substantially equal to the radial gap γ between the bottom surface of the concave portion 23 configuring the driving-side concave-convex portion 22 and the inner periphery (the radially inner side surface of the periphery covering piece 40a) of the periphery covering portion 38a (β≈ϵ). Further, the radial gap γ between the radially outer end surface of the convex portion 24 configuring the driving-side concave-convex portion 22 and the bottom surface of the concave portion 32 configuring the intermediate concave-convex portion 31 is larger than the radial gaps β and ϵ (γ>β, γ>ϵ). The radial gap β between the radially outer end surface of the convex portion 28 configuring the driven-side concave-convex portion 26 and the bottom surface of the elastic slit 39b is substantially equal to the radial gap γ between the bottom surface of the concave portion 27 configuring the driven-side concave-convex portion 26 and the inner periphery (the radially inner side surface of the periphery covering piece 40b) of the periphery covering portion 38b (β≈ϵ). Further, the radial gap γ between the radially outer end surface of the convex portion 27 configuring the driven-side concave-convex portion 26 and the bottom surface of the concave portion 32 configuring the intermediate concave-convex portion 31 is larger than the radial gaps β and ϵ (γ>β, γ>ϵ).

Accordingly, when eccentricity or inclination occurs between the driving-side transmission member 17 and the driven-side transmission member 18, the bottom surface of the concave portion 23 configuring the driving-side concave-convex portion 22 comes into contact with the radially inner side surface of the periphery covering portion 38a, and the radially outer end surface of the convex portion 24 configuring the driving-side concave-convex portion 22 comes into contact with the bottom surface of the elastic slit 39a. Therefore, the bottom surface of the concave portion 23 configuring the driving-side concave-convex portion 22 can be prevented from coming into contact with the radially inner side surface of the convex portion 33 configuring the intermediate concave-convex portion 31 or the radially inner side surface of the radial male side engagement portion 36a, and the radially outer end surface of the convex portion 24 configuring the driving-side concave-convex portion 22 can be prevented from coming into contact with the bottom surface of the concave portion 32 configuring the intermediate concave-convex portion 31. Further, the bottom surface of the concave portion 27 configuring the driven-side concave-convex portion 26 comes into contact with the radially inner side surface of the periphery covering portion 38b, and the radially outer end surface of the concave portion 28 configuring the driven-side concave-convex portion 26 comes into contact with the bottom surface of the elastic slit 39b. Therefore, the bottom surface of the concave portion 27 configuring the driven-side concave-convex portion 26 can be prevented from coming into contact with the radially inner side surface of the convex portion 33 configuring the intermediate concave-convex portion 31 or the radially inner side surface of the radial male side engagement portion 36b, and the radially outer end surface of the concave portion 28 configuring the driven-side concave-convex portion 26 can be prevented from coming into contact with the bottom surface of the concave portion 32 configuring the intermediate concave-convex portion 31.

In this case, even if the periphery covering portion 38a (38b) and a bottom surface portion of the elastic slit 39a (39b) are elastically deformed and the bottom surface of the concave portion 23 (27) configuring the driving-side concave-convex portion 22 (driven-side concave-convex portion 26) comes into contact with the radially inner side surface of the radial male side engagement portion 36a (36b), or the radially outer end surface of the convex portion 24 (28) configuring the driving-side concave-convex portion 22 (driven-side concave-convex portion 26) comes into contact with the bottom surface of the concave portion 32 configuring the intermediate concave-convex portion 31, the contact forces are weakened by the elastic deformation of the periphery covering portion 38a (38b) and the bottom surface portion of the elastic slit 39a (39b). Therefore, generation of abnormal noise to be caused as the contact occurs can be suppressed.

As described above, in the first embodiment, on one axial side surface of the side surface covering portion 37a of the driving-side elastic member 20, the guide concave portion 44a which is recessed in the axial direction compared with the peripheral portion is provided in the opening peripheral edge portion of each elastic slit 39a, 39a. On the other axial side surface of the side surface covering portion 37a of the driven-side elastic member 21, the guide concave portion 44b which is recessed in the axial direction compared with the peripheral portion is provided in the opening peripheral edge portion of each elastic slit 39b, 39b.

Therefore, it is possible to facilitate the operation of inserting the convex portion 24 configuring the driving-side concave-convex portion 22 into the elastic slit 39a by using the guide concave portion 44a as a guiding portion during the assembling.

Similarly, it is possible to facilitate the operation of inserting the convex portion 28 configuring the driven-side concave-convex portion 26 into the elastic slit 39b by using the guide concave portion 44b as a guiding portion.

Figure 15B:
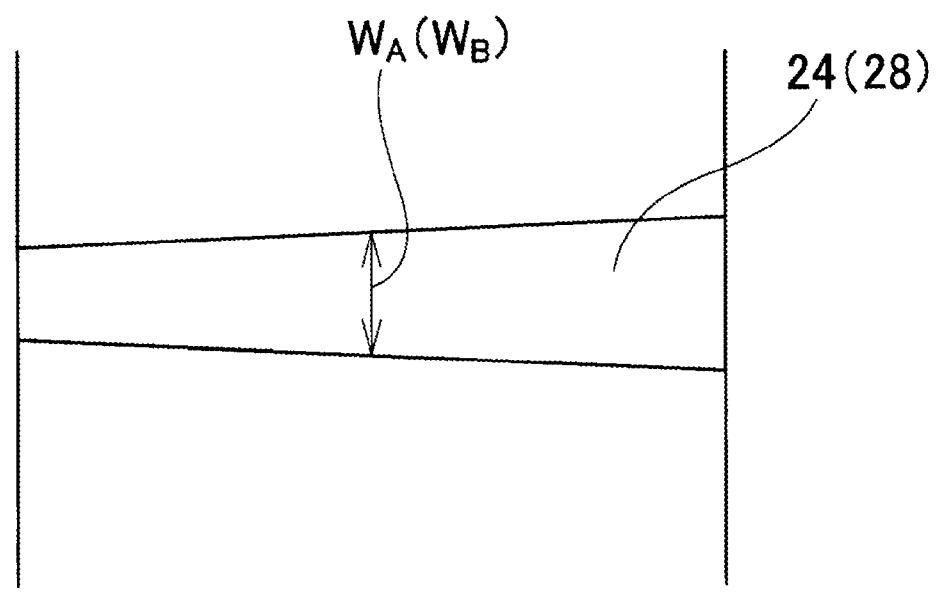

When implementing the present invention, the width dimension $W_A$ ($W_B$) of the convex portion 24 (28) configuring the driving-side concave-convex portion 22 (driven-side concave-convex portion 26) may decrease as proceeding toward a center side (the left side in the same figure, a tip end side) of the intermediate transmission member 19 in the axial direction as shown in FIG. 15B for example. According to such a configuration, a contact portion between the circumferential side surfaces of the convex portion 24 (28) configuring the driving-side concave-convex portion 22 (driven-side concave-convex portion 26) and the convex portion 33 configuring the intermediate concave-convex portion 31 is narrowed, so that a rotation resistance to be generated at the contact portion can be suppressed when misalignment occurs. Accordingly, the driving-side concave-convex portion 22 (driven-side concave-convex portion 26) and the intermediate concave-convex portion 31 are effectively prevented from partially contacting when the misalignment occurs.

When implementing the present invention, it is possible to adopt a single member (one in which the driving-side elastic member 20 and the driven-side elastic member 21 are integrally connected at an axial center portion of the intermediate transmission member 19) as an elastic member configuring the torque transmission joint.

When implementing the present invention, a configuration may also be adopted in which a driving-side transmission member includes a driving-side concave-convex portion on the inner periphery, a driven-side transmission member includes a driven-side concave-convex portion on the inner periphery, and an intermediate transmission member includes an intermediate concave-convex portion on the outer periphery, and further, an elastic member includes a side surface covering portion covering an axial side surface of the intermediate transmission member, and a periphery covering portion covering the outer periphery of the intermediate transmission member.

Second Embodiment

A second embodiment of the present invention will be described with reference to FIG. 20.

Figure 20:
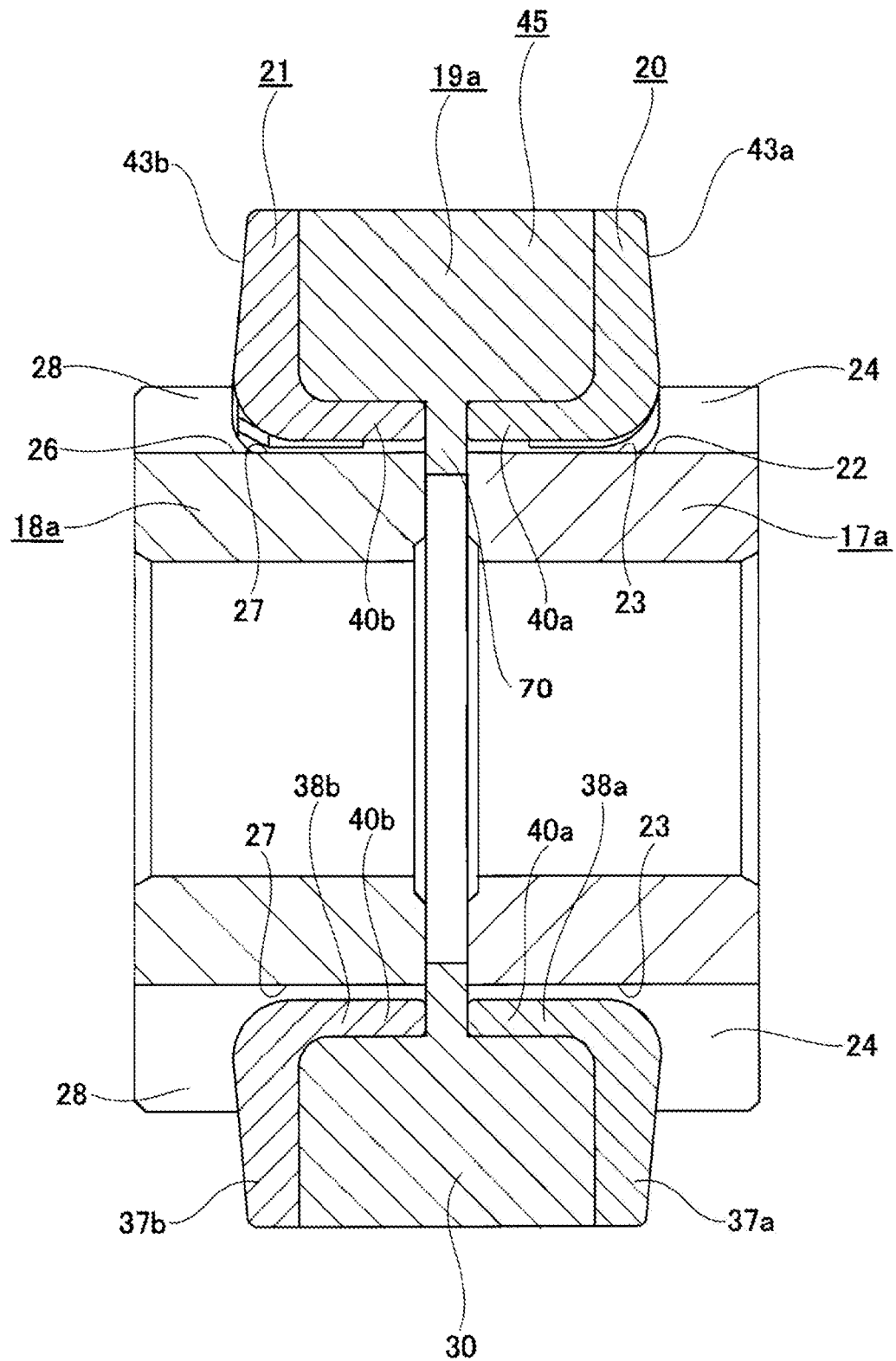
FIG. 20 is a similar view to FIG. 9 according to a second embodiment of the present invention.

As shown in FIG. 20, a torque transmission joint of the second embodiment is provided with a ring-shaped (with equal cutouts in a circumferential direction) stopper protrusion 70 at a center portion in a width direction of an inner periphery of an intermediate transmission member 19a. In the first embodiment described above, when the torque transmission joint is in an assembled state, a space between an end surface of a driving-side transmission member 17a which is on an opposite side to a collar portion 25 and an end surface of a driven-side transmission member 18a which is on an opposite side to a collar portion 29 is larger than a space between an end surface of a periphery covering piece 40a of a driving-side elastic member 20 and an end surface of a periphery covering piece 40b of a driven-side elastic member 21. In contrast, the two spaces are set to the same size in the second embodiment. A width of the stopper protrusion 70 is the same as the two spaces in dimension, and the stopper protrusion 70 is inserted between the two spaces in the assembled state. According to the configuration, movement of the intermediate transmission member 19a in an axial direction is restricted. Accordingly, an axial contact length between a convex portion 33 of the intermediate transmission member 19a and a concave portion 23 of the driving-side transmission member 17a is substantially the same as an axial contact length between the convex portion 33 of the intermediate transmission member 19a and a concave portion 27 of the driven-side transmission member 18a. Also, an axial contact length between a concave portion 32 of the intermediate transmission member 19a and a convex portion 24 of the driving-side transmission member 17a is substantially the same as an axial contact length between the concave portion 32 of the intermediate transmission member 19a and a convex portion 28 of the driven-side transmission member 18a.

In a case where the stopper protrusion 70 is not provided to the intermediate transmission member 19a, the intermediate transmission member 19a may move in the axial direction by a gap between the driving-side elastic member 20 as well as the driven-side elastic member 21 and a driving-side collar portion 25 and a driven-side collar portion 29. As a result, one axial contact length is shorter than the other axial contact length, and transmission torque is limited by the shorter contact length. In contrast, in the second embodiment, since both of the axial contact lengths hardly change, a problem that torque which can be transmitted is lowered due to reduction in the axial contact length does not occur. Further, in the second embodiment, it is not necessary to provide the collar portions 25, 29, so that cost can be reduced and the weight can be reduced.

Although the present invention has been described in detail with reference to particular embodiments, it should be appreciated for those skilled in the art that various changes and modifications can be made without departing from the spirit and scope of the present invention.

The present application is based on a Japanese Patent Application No. 2016-155992 filed on Aug. 8, 2016 and a Japanese Patent Application No. 2017-130028 filed on Jul. 3, 2017, the contents of which are incorporated herein by reference.

DESCRIPTION OF REFERENCE NUMERALS 1 steering wheel
2 steering shaft
3 housing
4 worm wheel
5 worm teeth
6, 6a worm shaft
7 electric motor
8 worm
9a, 9a rolling bearing
10 pressing piece
11 coil spring
12, 12a output shaft
13 spline hole
14 spline shaft portion
15 preload applying mechanism
16 torque transmission joint
17, 17a driving-side transmission member
18, 18a driven-side transmission member
19, 19a intermediate transmission member
20 driving-side elastic member
21 driven-side elastic member
22 driving-side concave-convex portion
23 concave portion
24 convex portion
25 driving-side collar portion
26 driven-side concave-convex portion
27 concave portion
28 convex portion
29 driven-side collar portion
30 main body portion
31 intermediate concave-convex portion
32 concave portion
33 convex portion
34a, 34b axial male side engagement portion
35a, 35b inclined side surface portion
36a, 36b radial male side engagement portion
37a, 37b side surface covering portion
38a, 38b periphery covering portion
39a, 39b elastic slit
40a, 40b periphery covering piece
41a, 41b axial female side engagement portion
42a, 42b radial female side engagement portion
43a, 43b inclined side surface portion
44a, 44b guide concave portion
45 coupling body
46a, 46b positioning side surface
70 stopper protrusion

The invention claimed is:

1. A torque transmission joint comprising:
a driving-side transmission member provided on an end portion of a driving shaft and including a driving-side concave-convex portion which is formed by alternately arranging concave portions and convex portions in a circumferential direction on one radial side periphery thereof;
a driven-side transmission member provided on an end portion of a driven shaft and including a driven-side concave-convex portion which is formed by alternately arranging concave portions and convex portions in the circumferential direction on one radial side periphery thereof;
an intermediate transmission member including an intermediate concave-convex portion which is formed by alternately arranging concave portions and convex portions in the circumferential direction on another radial side periphery thereof; and
a driving-side elastic member and a driven-side elastic member, each formed of an elastic material and assembled to the intermediate transmission member,
wherein each of the driving-side elastic member and the driven-side elastic member includes a side surface covering portion configured to cover an axial side surface of the intermediate transmission member, and a periphery covering portion configured to cover the another radial side periphery of the intermediate transmission member,
wherein the driving-side concave-convex portion is engaged with the driving-side elastic member and is engaged with one axial end portion of the intermediate concave-convex portion with a circumferential gap being interposed therebetween,
wherein the driven-side concave-convex portion is engaged with the driven-side elastic member and is engaged with another axial end portion of the intermediate concave-convex portion with a circumferential gap being interposed therebetween,
wherein the driving-side elastic member includes a plurality of elastic slits provided at a plurality of positions in the circumferential direction, each of the slits is open to an axial edge of the driving-side elastic member,
wherein the convex portions of the driving-side transmission member are engaged with the elastic slits of the driving-side elastic member, and in the engaged state, a radial gap is interposed between a radially outer end surface of each convex portion of the driving-side transmission member and a bottom surface of an engaged elastic slit of the driving-side elastic member,
wherein the driven-side elastic member includes a plurality of elastic slits provided at a plurality of positions in the circumferential direction, each of the slits is open to an axial edge of the driven-side elastic member, and
wherein the convex portions of the driven-side transmission member are engaged with the elastic slits of the driven-side elastic member, and in the engaged state, a radial gap is interposed between a radially outer end surface of each convex portion of the driven-side transmission member and a bottom surface of an engaged elastic slit of the driven-side elastic member.

2. The torque transmission joint according to claim 1,
wherein the driving-side concave-convex portion is engaged with the one axial end portion of the intermediate concave-convex portion in a state where the circumferential gap interposed therebetween is larger than a circumferential gap interposed between the driving-side concave-convex portion and the driving-side elastic member at an engagement portion therebetween.

3. The torque transmission joint according to claim 1,
wherein the driven-side concave-convex portion is engaged with the another axial end portion of the intermediate concave-convex portion in a state where the circumferential gap interposed therebetween is larger than a circumferential gap interposed between the driven-side concave-convex portion and the driven-side elastic member at an engagement portion therebetween.

4. The torque transmission joint according to claim 1,
wherein a positioning side surface which is in contact with or closely facing an axial side surface of a coupling body of the intermediate transmission member, the driving-side elastic member and the driven-side elastic member is provided on at least one of the driving-side transmission member and the driven-side transmission member.

5. The torque transmission joint according to claim 1,
wherein an inclined side surface portion which is inclined in a direction directed an axially inner side as proceeding toward a radially outer side is provided on the axial side surface of the coupling body of the intermediate transmission member, the driving-side elastic member and the driven-side elastic member.

6. The torque transmission joint according to claim 1,
wherein a guide concave portion which is recessed in the axial direction from a peripheral portion thereof is provided on at least one of one axial end opening peripheral edge portion of a portion to be engaged with the convex portion of the driving-side concave-convex portion on an axial side surface of the driving-side elastic member and another axial end opening peripheral edge portion of a portion to be engaged with the convex portion of the driven-side concave-convex portion on an axial side surface of the driven-side elastic member.

7. The torque transmission joint according to claim 1,
wherein the intermediate transmission member includes an axial male side engagement portion protruding from the axial side surface of the intermediate transmission member in the axial direction and a radial male side engagement portion protruding from the another radial side periphery of the intermediate transmission member in the radial direction which are continuous with each other, and
wherein each of the driving-side elastic member and the driven-side elastic member includes an axial female side engagement portion to be engaged with the axial male side engagement portion and a radial female side engagement portion to be engaged with the radial male side engagement portion which are continuous with each other.

8. The torque transmission joint according to claim 1,
wherein a circumferential width dimension of the convex portion of at least one of the driving-side concave-convex portion and the driven-side concave-convex portion decrease as proceeding toward a center side of the intermediate transmission member in the axial direction.

9. An electric power steering device comprising:
a housing;
a rotary shaft which is rotatably supported to the housing;
a worm wheel which is supported coaxially with the rotary shaft and configured to rotate together with the rotary shaft;
a worm which includes a worm shaft with worm teeth provided at an axial intermediate portion thereof, wherein axial end portions of the worm shaft are respectively rotatably supported to the housing by bearings with the worm teeth being meshed with the worm wheel; and
an electric motor which is configured to rotate the worm,
wherein an output shaft of the electric motor which is a driving shaft and the worm shaft which is a driven shaft are connected by a torque transmission joint such that torque can be transmitted, and
wherein the torque transmission joint is the torque transmission joint according to claim 1.

10. The electric power steering device according to claim 9, further comprising:
a preload applying mechanism provided between a tip portion of the worm shaft and the housing and configured to elastically press the worm toward the worm wheel.

* * * * *